(12) United States Patent
Hiyama et al.

(10) Patent No.: US 7,519,025 B2
(45) Date of Patent: Apr. 14, 2009

(54) MOBILE COMMUNICATION SYSTEM, LOCATION MANAGER AND ROUTING MANAGER

(75) Inventors: Satoshi Hiyama, Yokohama (JP);
Toshihiro Suzuki, Yokohama (JP);
Masashi Yamashita, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 736 days.

(21) Appl. No.: 10/764,481

(22) Filed: Jan. 27, 2004

(65) Prior Publication Data

US 2004/0258011 A1    Dec. 23, 2004

(30) Foreign Application Priority Data

Jan. 30, 2003    (JP) .............................. 2003-022450

(51) Int. Cl.
*H04W 4/00* (2006.01)
(52) U.S. Cl. ...................... 370/331; 370/328; 370/329
(58) Field of Classification Search ................ 370/310, 370/328, 329, 331, 338, 351, 352, 353, 389, 370/392, 401, 469, 474, 475, 476
See application file for complete search history.

(56) References Cited

U.S. PATENT DOCUMENTS

| | | | |
|---|---|---|---|
| 6,243,575 B1 | 6/2001 | Ohyama et al. | |
| 6,636,498 B1 * | 10/2003 | Leung | 370/338 |
| 6,697,355 B1 * | 2/2004 | Lim | 370/352 |
| 6,721,297 B2 * | 4/2004 | Korus et al. | 370/338 |
| 6,925,378 B2 * | 8/2005 | Tzamaloukas | 701/200 |
| 6,961,573 B1 * | 11/2005 | Moon et al. | 455/445 |
| 7,039,404 B2 * | 5/2006 | Das et al. | 455/435.1 |
| 7,110,377 B2 * | 9/2006 | Hsu et al. | 370/331 |

(Continued)

FOREIGN PATENT DOCUMENTS

EP    0 936 829 A2    8/1999

(Continued)

OTHER PUBLICATIONS

H. Yumiba et al., "A study on concatenated mobility management" The Institute of Electronics, Information and Communication Engineers (Feb. 2002), Technical Report of IEICE, pp. 7-14.

*Primary Examiner*—Wing F. Chan
*Assistant Examiner*—Mark A. Mais
(74) *Attorney, Agent, or Firm*—Crowell & Moring LLP

(57) ABSTRACT

Use of finite wireless resources is minimized when paging is performed to an MN, even if a location manager does not retain correct location area information for the reason that a mobile router (MR), which performs location update (LU) on behalf of mobile nodes (MNs) existing in the space in a moving body, does not send an LU signal because it is active, for example. A flag indicating whether an MR#1 is dormant or active is retained in a location manager LM#1. When paging is performed to an MN#2 which is in a master-slave relationship with the MR#1, the LM#1 refers to the flag to determine the state of the MR#1. When the MR#1 is active, the LM#1 inquires of a routing manager RM#1 about routing address information for the MR#1 and performs paging using the information. Thus, it is possible to perform paging to the MN#2 which is in a master-salve relationship with the MR#1, without the MR#1, which is moving in an active state, sending an LU signal.

8 Claims, 15 Drawing Sheets

U.S. PATENT DOCUMENTS

| | | | |
|---|---|---|---|
| 7,136,645 B2 * | 11/2006 | Hanson et al. | 455/435.1 |
| 7,146,186 B1 * | 12/2006 | Moon et al. | 455/552.1 |
| 7,149,197 B2 * | 12/2006 | Garahi et al. | 370/328 |
| 7,173,917 B1 * | 2/2007 | Narayanan et al. | 370/331 |
| 7,206,294 B2 * | 4/2007 | Garahi et al. | 370/315 |

FOREIGN PATENT DOCUMENTS

| | | | |
|---|---|---|---|
| EP | 1237389 A2 | 9/2002 |
| JP | 02-162845 A | 6/1990 |
| JP | 04-042696 A | 2/1992 |
| JP | 05055991 A | 3/1993 |
| JP | 05-259971 A1 | 10/1993 |
| JP | 11-046380 A | 2/1999 |
| JP | 11-234736 A | 8/1999 |
| JP | 11355835 | 12/1999 |

* cited by examiner

MOBILE COMMUNICATION SYSTEM, LOCATION MANAGER AND ROUTING MANAGER

BACKGROUND OF THE INVENTION

1. Field of the Invention

The present invention relates to a mobile communication system, a location manager and a routing manager, and in particular to a method for managing location and performing paging in a mobile communication system.

2. Description of the Related Art

As is well known, it is common in mobile communication services to store the location of each mobile node, such as a cellular telephone, in a location manager in order that the mobile node can receive termination (incoming call/packet) wherever it is. Specifically, an area, for which a mobile communication service is provided, is divided in multiple registration areas, and when a mobile node moves from one registration area to another registration area, a location update request, in which a registration area after movement is identified, is sent from the moving node to the mobile network via an base-station apparatus, consuming wireless resources. In response to the location update request, the registration area of each mobile node, which is stored in the location manager is sequentially updated.

However, when a lot of mobile nodes simultaneously move in a moving body, for example, when there are a lot of passengers carrying a mobile node in a train, a lot of mobile nodes move at the same time as the train moves, and if the train moves from one registration area to another registration area, a location update request is sent to a mobile network from each of these mobile nodes via an base-station apparatus. This causes problems such as pressure on wireless resources and temporary, significant increase in communication traffic in the mobile network.

Techniques for solving these problems are disclosed in Patent Document 1 and Non-patent Document 1, for example. In these documents, a mobile communication system is disclosed in which a master-slave relationship is established between a moving body, such as a train, and a mobile node existing in the space in the moving body so that a mobile router installed in the moving body, which is a master, sends a location update request of the mobile nodes, which are slaves, to the mobile network on behalf of the mobile nodes, consuming wireless resources. In this mobile communication system, a mobile node existing in the space in a moving body registers its location with the above mobile router as a virtual base-station apparatus. When the moving body moves from one registration area to another registration area, the mobile router sends a location update request to the mobile network via a base-station apparatus. In this way, it is realized that the mobile router sends a location update request of mobile nodes existing in the space in a moving body.

(Patent Document 1)
Published Unexamined Patent Application No. 11-355835

(Non-Patent Document 1)
"A Study on Concatenated Mobility Management" by Yumiba, Sasada, Fujiwara and Yabusaki, IEICE Technical Report; N2000-177, pp. 7-14; February 2001

However, the mobile communication system disclosed in the above published unexamined patent applications and the like has the following problem. That is, when all the mobile nodes (hereinafter referred to as MN for short) existing in the space in a moving body and a mobile router (hereinafter referred to as MR for short) installed in the moving body and performing location update (hereinafter referred to as LU for short) move together in a dormant state, it is necessary for the MR, each time they move from one location area (hereinafter referred to as LA for short) to another location area, to send an LU signal to a location manager (hereinafter referred to LM for short), which retains location area information for the MNs and the MR, in order to update information for the LA where the MR exists.

However, if the MR itself is in communication, or one or more MNs, which are in a master-slave relationship with the MR, is in communication via the MR, for example, the MR, which is not dormant, does not send an LU signal even if they move to different LAs. Therefore, the LA of the MR cannot be updated in the LM. This causes a problem that the MN cannot receive the paging.

The present invention has been made in consideration of the above problem, and its object is to provide a mobile communication system, a location manager and a routing manager capable of minimizing use of finite wireless resources and enabling paging to be performed to an MN even when an LM does not necessarily retain correct LA information, for example, for the reason that the MR, performing LU of MNs existing in the space in a moving body on behalf of the MNs, does not send an LU signal because it is active.

SUMMARY OF THE INVENTION

The mobile communication system according to claim 1 of the present invention is a mobile communication system wherein a mobile router moving with mobile nodes performs location update of the mobile nodes on behalf of the mobile nodes; the mobile communication system comprising: means for retaining a flag indicating whether the mobile router is active or not; means for inquiring about routing address information for the mobile router based on the value of the retained flag when paging is performed to the mobile node; and means for performing paging to the mobile node using the routing address information obtained as a result of the inquiry. The location manger performs paging using the routing address information obtained by an inquiry, and therefore it is possible to perform paging to a mobile node which is in a master-slave relationship with a mobile router moving in an active state, without the mobile router consuming finite wireless resources to send a location update request signal. Furthermore, by performing paging with the use of a routing address, which is more detailed location information than location area information, it is possible to minimize consumption of wireless resources required for performing paging.

The mobile communication system according to claim 2 of the present invention is the mobile communication system according to claim 1; further comprising means for setting the flag to a value indicating an active state in response to a signal sent from the mobile node and indicating start of communication, and setting the flag to a value indicating a dormant state in response to a signal sent from the mobile node and indicating end of communication. By controlling the value of a flag utilizing a signal which indicates start/end of an active state, it is possible to easily recognize whether the state is active or dormant.

The mobile communication system according to claim 3 of the present invention is a mobile communication system wherein a mobile router moving with mobile nodes performs location update of the mobile nodes on behalf of the mobile nodes; the mobile communication system comprising:

a routing manager comprising: a table for storing routing address information for the mobile router; and means for, when the routing address information for the mobile router in the table is updated, notifying the updated routing address information; and a location manager comprising:

a table for storing the routing address information notified by the routing manager as location area information for the mobile router; and means for performing paging to the mobile node using the location area information stored in the table. This makes it possible to perform paging to a mobile node which is in a master-slave relationship with the mobile router, without retaining a flag. The "routing manager" includes multiple routing managers provided in hierarchies, such as a configuration with local routing managers and home location managers. The "routing manager" includes multiple location managers provided in hierarchies, such as a configuration with local location managers and home location managers.

The location manager according to claim 4 of the present invention is a location manager wherein a mobile router moving with mobile nodes performs location update of the mobile nodes on behalf of the mobile nodes; the location manger comprising: means for retaining a flag indicating whether the mobile router is active or not; means for inquiring about routing address information for the mobile router based on the value of the retained flag when paging is performed to the mobile node; and means for performing paging to the mobile node using the routing address information obtained as a result of the inquiry. The location manger performs paging using the routing address information obtained by an inquiry, and therefore it is possible to perform paging to a mobile node which is in a master-slave relationship with a mobile router moving in an active state, without the mobile router consuming finite wireless resources to send a location update request signal.

The location manager according to claim 5 of the present invention is the location manager according to claim 4; further comprising means for setting the flag to a value indicating an active state in response to a signal sent from the mobile node and indicating start of communication, and setting the flag to a value indicating a dormant state in response to a signal sent from the mobile node and indicating end of communication. By controlling the value of a flag utilizing a signal which indicates start/end of the active state, it is possible to easily recognize whether the state is active or dormant.

The location manager according to claim 6 of the present invention is a location manager wherein a mobile router moving with mobile nodes performs location update of the mobile nodes on behalf of the mobile nodes; the location manger comprising: a table for storing routing address information for the mobile router, which is notified whenever the routing address is updated, as location area information for the mobile router; and means for performing paging to the mobile node using the location area information stored in the table. This makes it possible to perform paging to a mobile node which is in a master-slave relationship with the mobile router, without retaining a flag.

The routing manager according to claim 7 of the present invention is a routing manager used for a mobile communication system wherein a mobile router moving with mobile nodes performs location update of the mobile nodes on behalf of the mobile nodes; the routing manager comprising: a table for storing routing address information for the mobile router; means for replying the routing address information stored in the table in response to an inquiry about the routing address information for the mobile router. Furthermore, by performing paging with the use of a routing address, which is more detailed location information than location area information, it is possible to minimize consumption of wireless resources required for performing paging.

The routing manager according to claim 8 of the present invention is a routing manager used for a mobile communication system wherein a mobile router moving with mobile nodes performs location update of the mobile nodes on behalf of the mobile nodes; the routing manager comprising: a table for storing routing address information for the mobile router; means for, when the routing address information for the mobile router in the table is updated, notifying the updated routing address information. This makes it possible to perform paging to a mobile node which is in a master-slave relationship with the mobile router, without retaining a flag.

BRIEF DESCRIPTION OF THE DRAWINGS

FIG. 4A shows the operation performed when origination/termination for MN is occurred and FIG. 4B shows the operation performed when communication ends;

FIG. 15A shows the operation performed when origination/termination for MN is occurred and FIG. 15B shows the operation performed when communication ends;

DETAILED DESCRIPTION OF THE PREFERRED EMBODIMENTS

Description will now be made on embodiments of the present invention with reference to drawings. On each of the figures to be referred to in the description below, portions corresponding to those on the other figures are indicated by the same symbols. Among mobile nodes shown in each figure, those which are hatched are dormant and those which are not hatched are active.

First Embodiment

A: Configuration of a Mobile Communication System

Figure 1:
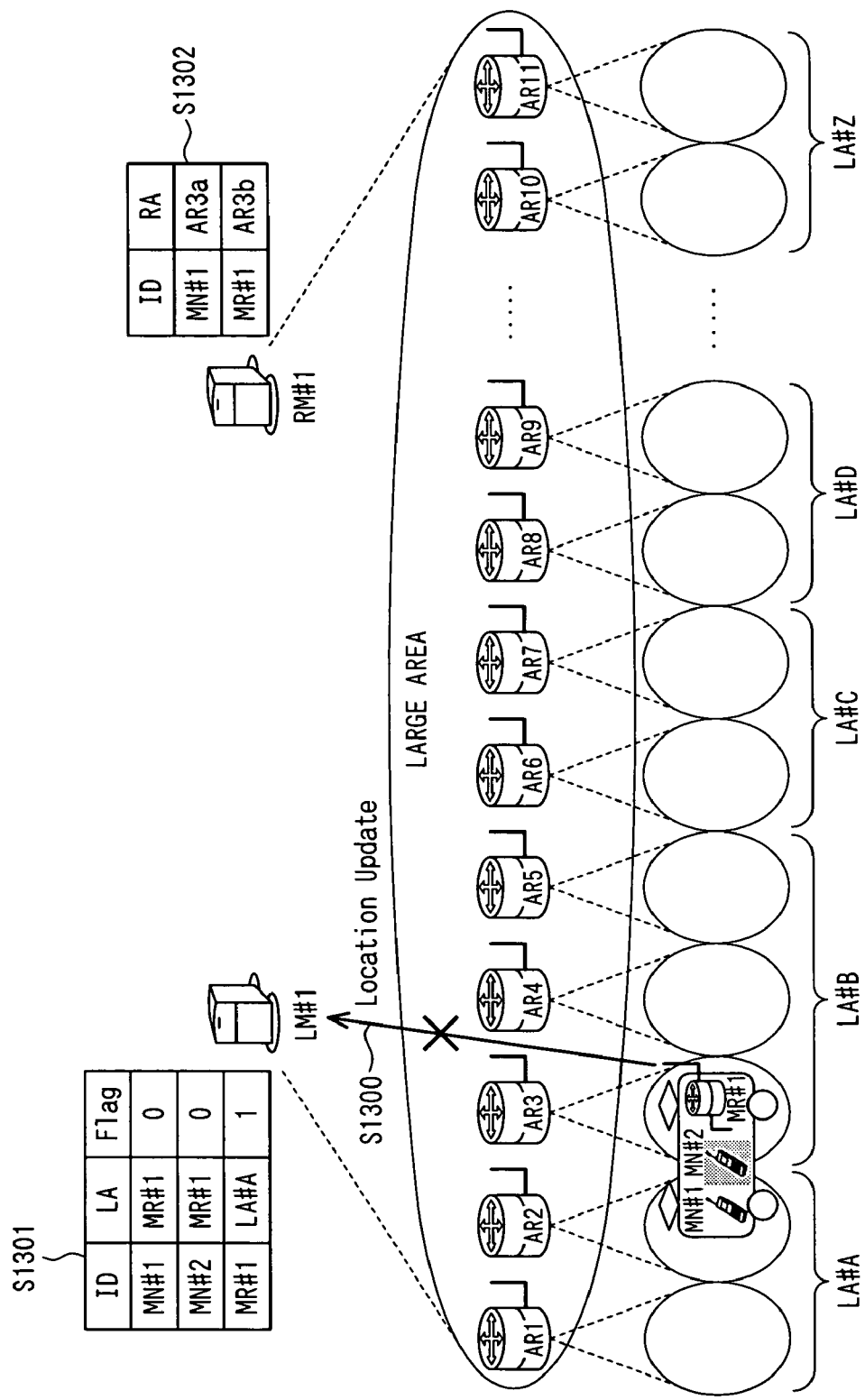
FIG. 1 shows a first embodiment of a mobile communication system according to the present invention.

FIG. 1 shows a first embodiment of a mobile communication system according to the present invention.

As shown in the figure, this system is configured to include a location manager LM#1 for storing LA information for mobile nodes and a mobile router, or master-slave relationship information indicating a master-slave relationship between the mobile router and the mobile nodes; a routing manager RM#1 (hereinafter referred to as RM for short) for storing routing address (hereinafter referred to as RA for short) information for the MNs and the MR; and ARs 1 to 11 for signaling an area identification (hereinafter referred to as ArI for short) to the mobile nodes and the mobile router and retaining a correspondence relationship between the ArI and area address managed as an LA within a network.

As shown in the figure, this system is configured to include a mobile router MR#1 performing LU of MNs existing in the space in a moving body on behalf of the MNs during movement in a dormant state, and mobile nodes MN#1 and MN#2 which do not perform LU when they are in the same space in a moving body with the mobile router MR#1, even if they are in a dormant state.

There is formed a large area for the location manager LM#1 and the routing manager RM#1. There are included a lot of ARs in this area. Each of location areas LA#A, LA#B, LA#C, LA#D, . . . , LA#Z is a set of multiple areas, each of which is associated with each of the ARs.

Though not specifically shown in the figure, there is generally provided a router or a switch for transferring a signal between AR and LM/RM or between LM and RM.

In the figure, it has been registered with the LM#1 that the LAs for the identifications (IDs) "MN#1" and "MN#2" are "MR#1" and that the LA for the identification (ID) "MR#1" is "LA#A" (S1301).

In the RM#1, there are stored RA information for the MR#1 and the MN#1. That is, it is registered that the RA information for the identification (ID) "MN#1" is "AR3$a$" and the RA information for the identification (ID) "MR#1" is "AR3$b$" (S1302).

In this situation, if the MN#1 and the MR#1 move from the LA#A to the LA#B while being active, an LU signal is not sent from the MR#1 (S1300). Accordingly, the LA where the MR#1 exists is still indicated as LA#A in the LM#1. In this case, when paging is performed to the dormant MN#2 which is in a master-slave relationship with the MR#1, the paging is performed to the LA#A where the MN#2 does not actually exist if the operation similar to that of a prior-art mobile communication system is performed. This causes a problem that the MN#2 existing in the LA#B cannot receive the paging.

To cope with this problem, it is conceivable that an MR should send an LU signal whether it is dormant or active. However, when an MR is active, in general, an RM retaining routing addresses for the MR and MNs retains more detailed location information (RA information) than an LA, which is indicated by an AR for the area where the MR exists, and therefore it is inefficient, from a viewpoint of consumption of finite wireless resources, that information in an LM is updated by the MR sending an LU signal.

Accordingly, in this system, a flag for determining whether an MR is dormant or active is retained in a table in an LM. When paging is performed to an MN in a master-slave relationship with the MR, the LM determines the state of the MR. If the MR is determined to be active, the LM inquires of the RM about RA information for the MR, and performs paging to the address indicated by the obtained RA information.

Figure 2:
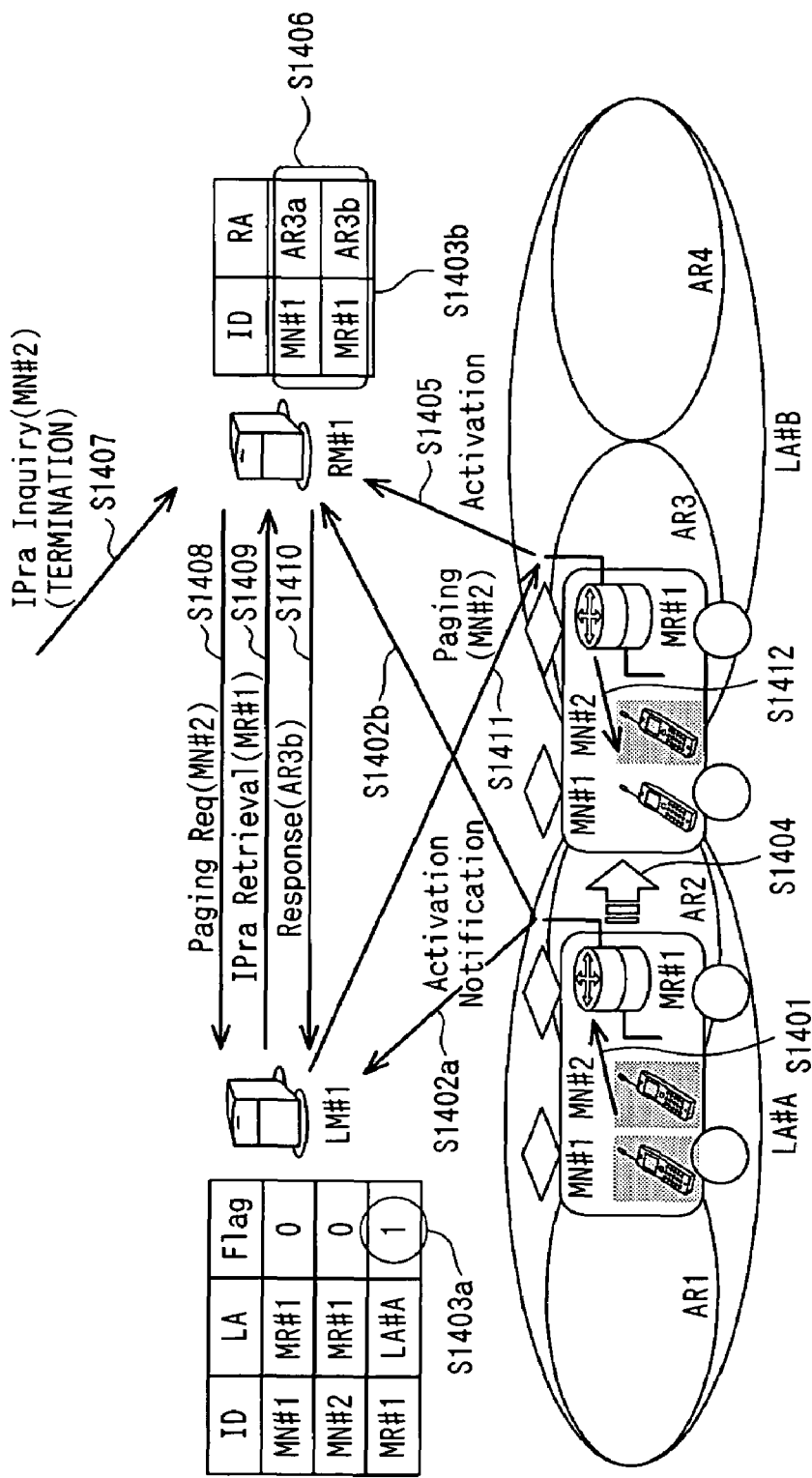
FIG. 2 shows a procedure for performing paging in the mobile communication system in FIG. 1.

Description will be made below on the procedure for performing paging, with reference to FIG. 2.

In the figure, when receiving an activation signal from the MN#1, which is going to perform origination (S1401), the MR sends an activation notification signal to the LM#1 and the RM#1 (S1402$a$ and S1402$b$). The LM#1 sets "1" as a value of a flag for an entry with an identification (ID) "MR#1" in its table (S1403$a$). In the RM#1, for each of the entries with identifications (IDs) "MN#1" and "MR#1", RA information is written (S1403$b$). In this specification, the value "1" of the flag means an active state and the value "0" of the flag means a dormant state (being not active).

When the MR#1 moves from the LA#A to the LA#B (S1404), a handover process is performed for the MN#1 and the MR#1, which are active. Consequently, an activation signal is sent from the MR#1 (S1405), and RA information is updated in the RM#1 (S1406).

In this case, if termination is performed to the MN#2 (S1407), then the RM#1, receiving the termination, sends a paging request (paging req) to the LM#1 (S1408) because it does not retain RA information for the dormant MN#2.

The LM#1 detects that the MN#2 is dependent on the MR#1 and that the MR#1 is active. The LM#1 therefore inquires of the RM#1 about a routing address for the MR#1 (S1409). In response to this, the routing address for the MR#1 "AR3$b$" is sent from the RM#1 and inputted into the LM#1 (S1410). The LM#1 performs paging to the MN#2 using the routing address "AR3$b$" (S1411). Receiving this, the MR#1 sends a paging signal to the MN#2 (S1412). The MN#2 is then active and in communication with the origination source.

B: Operation of a Mobile Communication System

First Operation Example

Description will be made on a first operation example with reference to FIGS. 3 and 4 describing the procedure shown in FIG. 2 in detail. These figures show the operations performed by the mobile nodes MN#1 and MN#2, the mobile router MR#1, access routers AR1, AR2 and AR3, the LM#1 and the RM#1. These figures are associated with the block diagram shown in FIG. 1.

Figure 3:
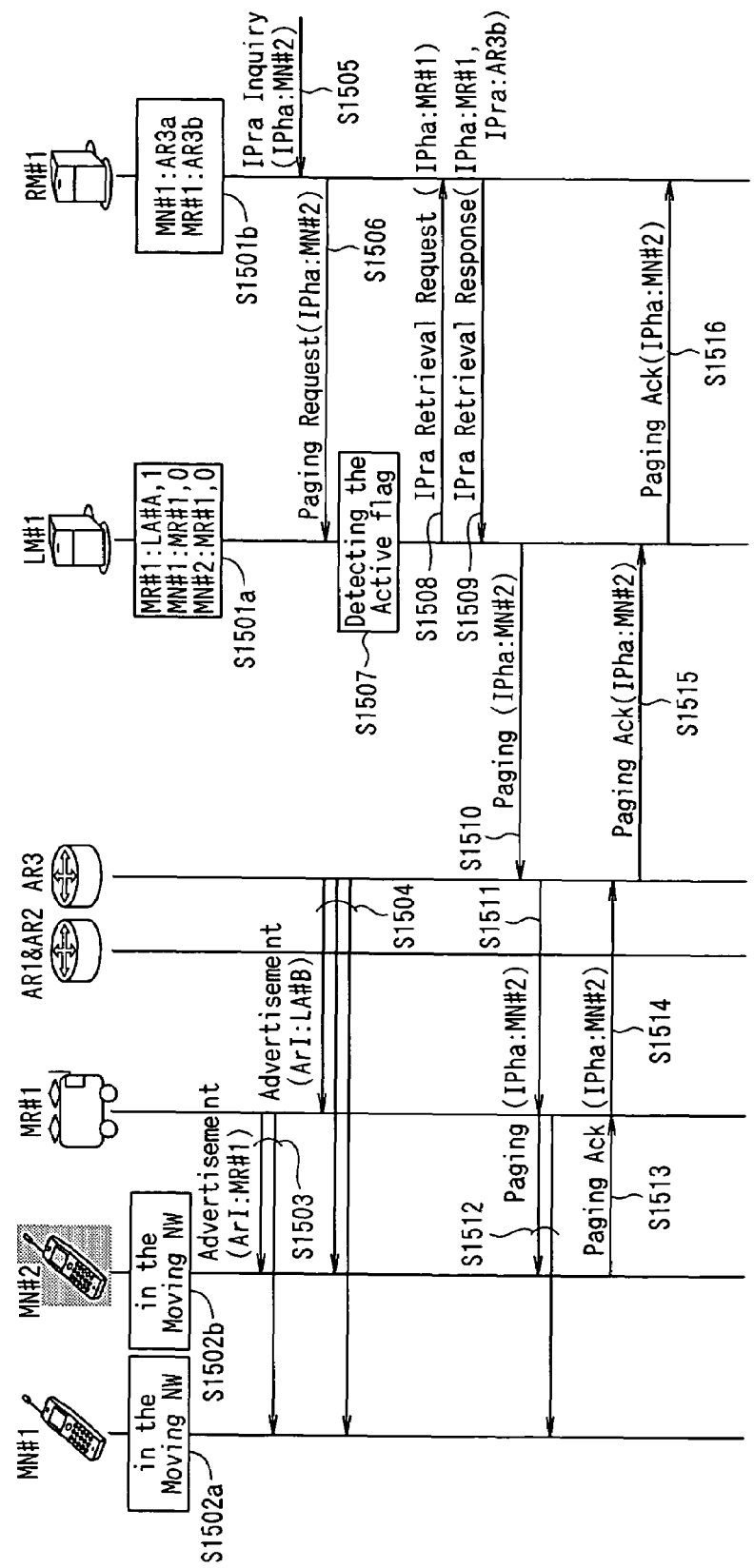
FIG. 3 is a sequence diagram showing the situation when paging is performed to a mobile node, which is in a master-slave relationship with a mobile router and is now dormant, in a first operation example of the mobile communication system according to the first embodiment of the present invention.

FIG. 3 is a sequence diagram showing the situation when paging is performed to the MN#2 which is in a master-slave relationship with the MR#1 and is now dormant.

It is assumed here that the MR#1 and the MN#1 became active when they were in the LA#A and have moved from management by the AR2 included in the LA#A to management by the AR3 included in the LA#B while being active.

In the figure, RA information for the active MR#1 and MN#1 is stored in the RM#1. That is, it is registered that the RA information for the identification (ID) "MN#1" is "AR3$a$" and that the RA information for the identification (ID) "MR#1" is "AR3$b$" (S1501$b$).

It is registered with the LM#1 that the LA for the identification "MR#1" is "LA#A" and the flag is "1", that the LA for the identification "MN#1" is "MR#1" and the flag is "0", and that the LA for the identification "MN#2" is "MR#1" and the flag is "0" (S1501$a$).

The mobile node MN#1 exists in the moving network (S1502$a$), and the mobile node MN#2 also exists in the moving network (S1502$b$). The mobile router MR#1 has sent an advertisement indicating that the ArI is "MR#1" to all the mobile nodes (MN#1 and MN#2) within the moving network (S1503). The mobile nodes MN#1 and MN#2 and the mobile router MR#1 have received an advertisement indicating that the ArI is "LA#B", from the access router AR3 (S1504).

In this situation, if termination is performed to the mobile node MN#2 which is in a master-slave relationship with the MR#1 and is now dormant (S1505), then the RM#1, receiving the termination, searches for its table. If it detects that there is no entry about the MN#2, it recognizes that the MN#2 is dormant. The RM#1 then identifies the LM#1 as the LM for the MN#2 using the identification IPha, which is a specific address, as a key, and sends a paging request (S1506). Receiving this paging request, the LM#1 searches for its table and detects that the MN#2 is dependent on the MR#1 and the MR#1 exists in the LA#A. The LM#1 then refers to the flag for the MR#1. Since the value of the flag for the MR#1 is "1" then, the LM#1 detects that the MR#1 is active (S1507).

Figure 4A:
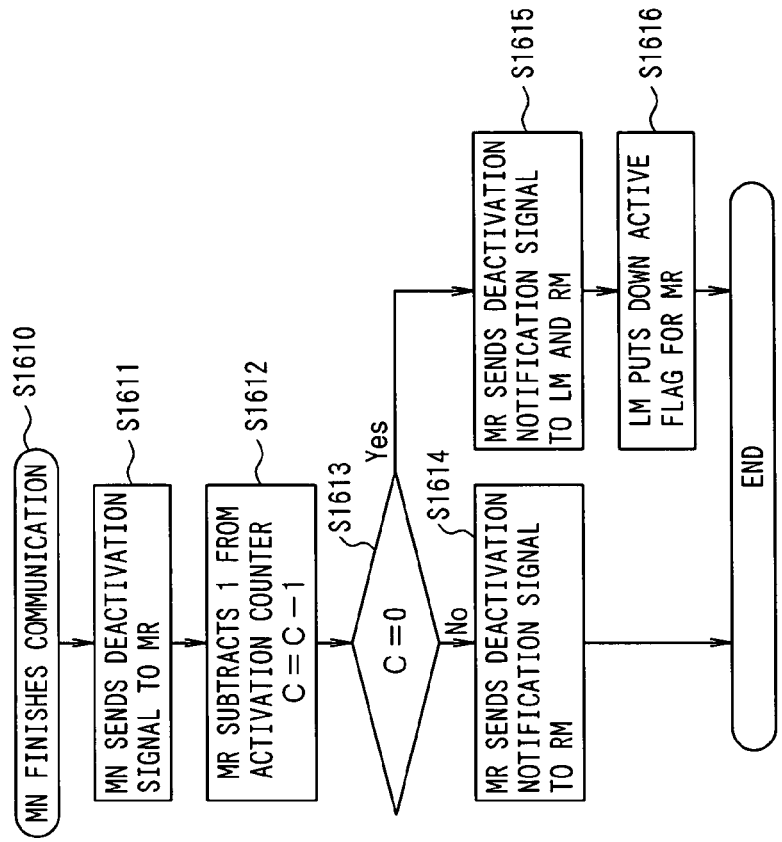
FIGS. 4A and 4B show flowcharts showing an example of an algorithm for controlling a flag in the mobile communication system according to the first embodiment of the present invention.
Figure 4B:
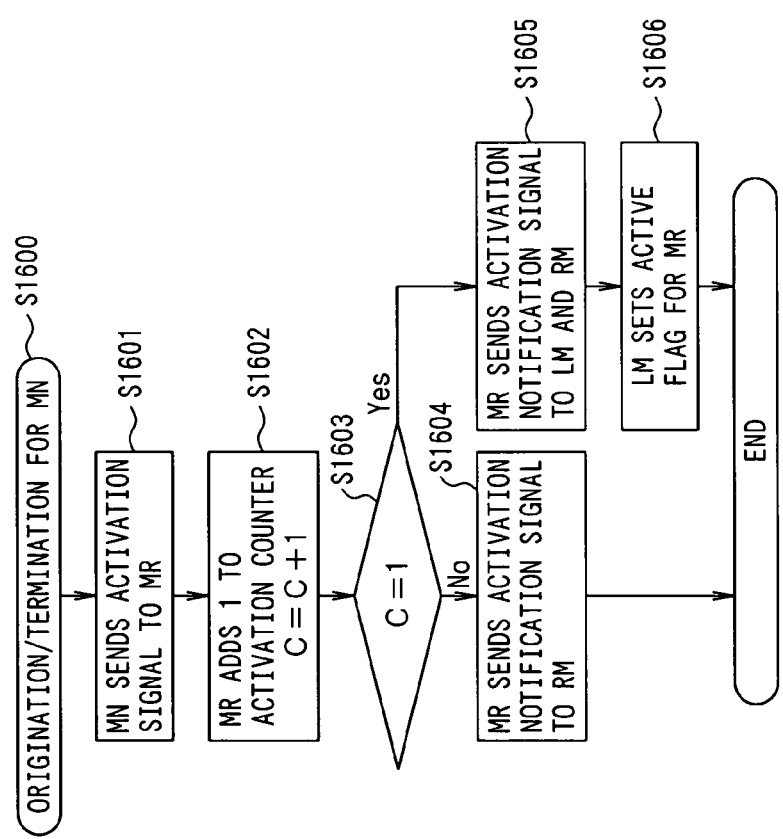

FIGS. 4A and 4B show examples of an algorithm for controlling the flag. In FIG. 4A, when origination/termination for MN is occurred (step S1600), the MN sends an activation signal to an MR (step S1601). In response to this, the MR adds 1 to a counter (activation counter) (step S1602). That is, "C=C+1" is executed, where C is the count value of the counter.

If the count value C of the counter is not 1 (C≠1), the MR sends an activation notification signal only to the RM (from step S1603 to S1604). On the contrary, if the count value C is 1 (C=1), the MR sends an activation notification signal to the LM and the RM (from step S1603 to S1605). The LM then sets a flag (active flag) for the MR (step S1606), and thereby the value of the flag becomes "1".

In FIG. 4B, when the MN finishes communication (step S1610), the MN sends a deactivation signal to the MR (step S1611). In response to this, the MR subtracts 1 from the counter (activation counter) (step S1612). That is, "C=C−1" is executed, where C is the count value of the counter.

If the count value C of the counter is not 0 (C≠0), the MR sends a deactivation notification signal only to the RM (from step S1613 to S1614). On the contrary, if the count value C is 0 (C=0), the MR sends a deactivation notification signal to the LM and the RM (from step S1613 to S1615). The LM then puts down the flag for the MR (active flag) (step S1616), and thereby the value of the flag becomes "0".

As described above, in this example, the MR grasps the number of active MNs based on the activation/deactivation signal, which is sent when origination/termination for MN is occurred or when communication ends. When the value changes from "0" to "1" and vice versa, it is notified to the LM. Receiving the notification, the LM controls setting and putting down of the flag, that is, setting of the flag for the MR.

In short, the flag for an MR is set to a value indicating an active state in response to a signal which is sent from a mobile node and indicates start of communication, and set to a value indicating a dormant state in response to a signal which is sent from a mobile node and indicates end of communication.

Returning to FIG. 3, the LM#1, which has detected that the MR#1 is active from the value of the flag "1", inquires of the RM#1 about RA information for the MR#1 (S1508). Receiving this inquiry, the RM#1 searches for its table and responds with "AR3$b$", which is RA information for the MR#1 (S1509). Receiving the response, the LM#1 performs paging to the "AR3$b$", which is the obtained RA information (S1510). This paging signal is transferred to the MR#1 via the AR3 (S1511), and the MR#1, receiving it, signals it to the nodes within the moving body (S1512). In this manner, the paging signal reaches the MN#2.

When the mobile node MN#2 sends a response (Paging Ack) in response to the paging signal (S1513), the response is inputted into the RM#1 via the mobile router MR#1, the access router AR3 and the LM#1 (S1514, S1515 and S1516).

Now, description will be made on the configurations of an LM and an RM for realizing the operation described above, with reference to FIGS. 5 and 6.

Figure 5:
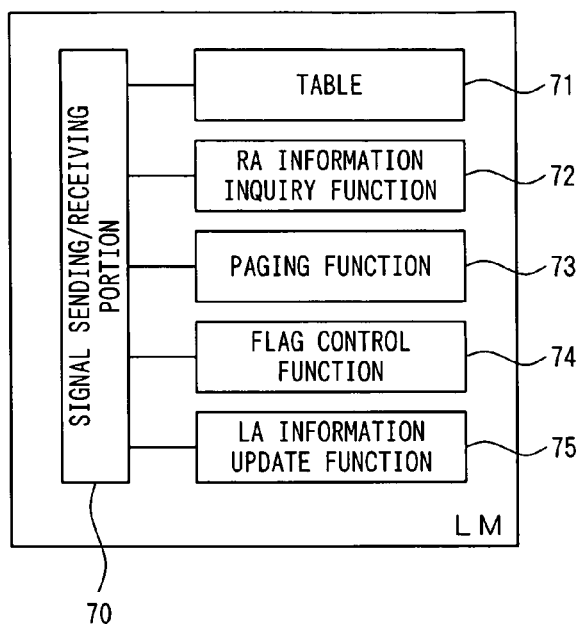
FIG. 5 is a block diagram showing a configuration example of an LM for realizing the first operation example of the mobile communication system according to the first embodiment of the present invention.

As shown in FIG. 5, an LM is configured to include a table 71 for storing LAs for mobile nodes and a mobile router, and flags indicating whether they are active or dormant; an RA information inquiring function 72 for inquiring of an RM about RA information; a paging function 73 for performing paging with the use of the RA information obtained as a result of the inquiry or LA information it retains; a flag control function 74 for rewriting the value of the flag; an LA information update function 75 for updating LA information registered with the LM itself; and a signal sending/receiving portion 70 forming an interface for sending/receiving a signal between external apparatuses, such as an AR and an RM, and each portion within the LM itself.

Figure 6:
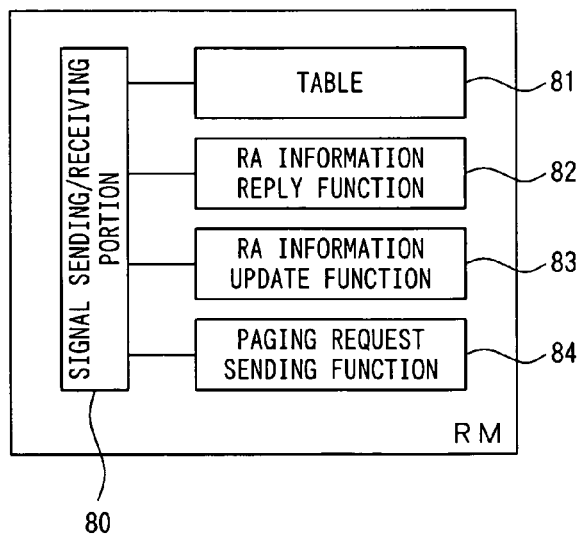
FIG. 6 is a block diagram showing a configuration example of an RM for realizing the first operation example of the mobile communication system according to the first embodiment of the present invention.

As shown in FIG. 6, an RM is configured to include a table 81 for storing RA information for mobile nodes and a mobile router; an RA information reply function 82 for replying RA information in response to an inquiry by an LM; an RA information update function 83 for updating RA information registered with the RM itself; a paging request sending function 84 for sending a paging request; and a signal sending/receiving portion 80 forming an interface for sending/receiving a signal between external apparatuses, such as an AR and an LM, and each portion within the RM itself.

Figure 7:
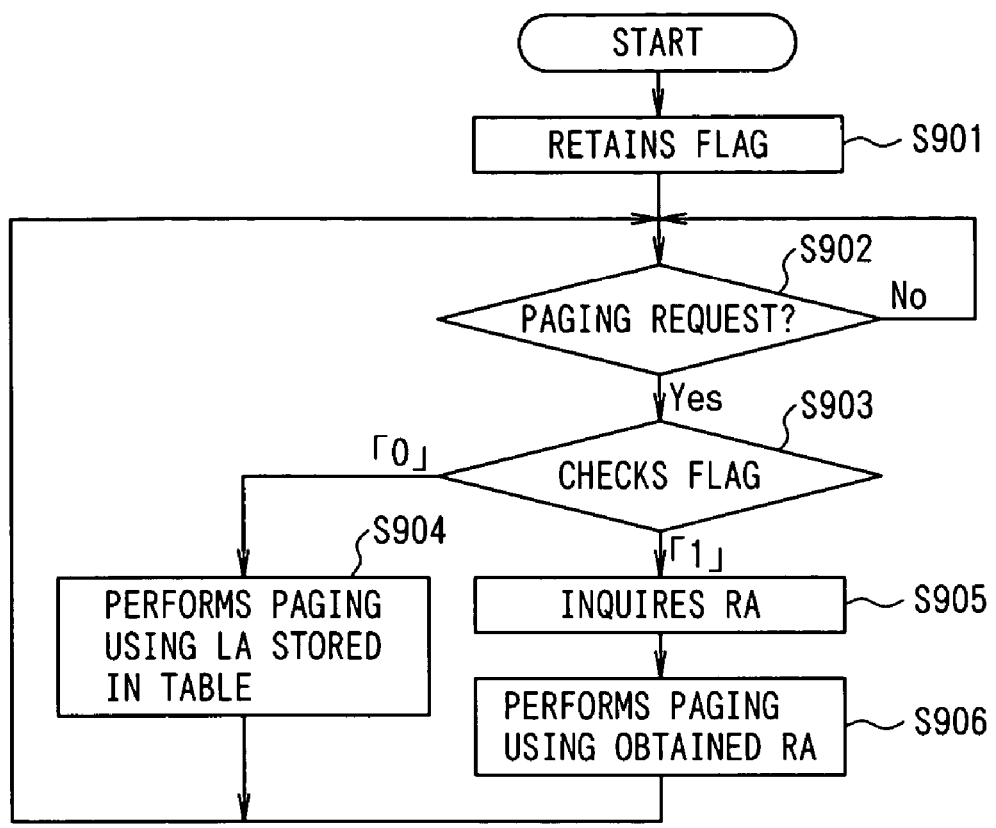
FIG. 7 is a flowchart showing the operation of the LM shown in FIG. 5 and the RM shown in FIG. 6.

Description will be made on the operation of the LM and the RM configured as above, with reference to FIG. 7. The figure is a flowchart showing the operation of the LM shown in FIG. 5 and the RM shown in FIG. 6. In the figure, flags are stored in the table in the LM, which indicate whether the mobile nodes and the mobile router are active or dormant (step S901). It is then determined whether there has been received paging request to any mobile node (step S902). If there has been received paging request, the value of the flag for the mobile router, which is stored in the table, is checked (step S903).

If the value of the flag is "0", which indicates a dormant state, then the LM performs paging to the mobile node using LA information stored in the table in the LM (from step S903 to S904).

On the contrary, if the value of the flag is "1", which indicates an active state, then the LM inquires of the RM about RA information for the mobile router (from step S903 to S905). The LM then performs paging to the mobile node using the RM information obtained from a response returned to the LM by the RM in response to the inquiry (step S906).

The operation described above makes it possible to perform paging to a mobile node which is in a master-slave relationship with a mobile router moving in an active state, without the mobile router consuming finite wireless resources to send an LU signal. Furthermore by performing paging with the use of RA information, which is more detailed location information than LA information, it is possible to minimize consumption of wireless resources required for performing paging.

Second Operation Example

Figure 8:
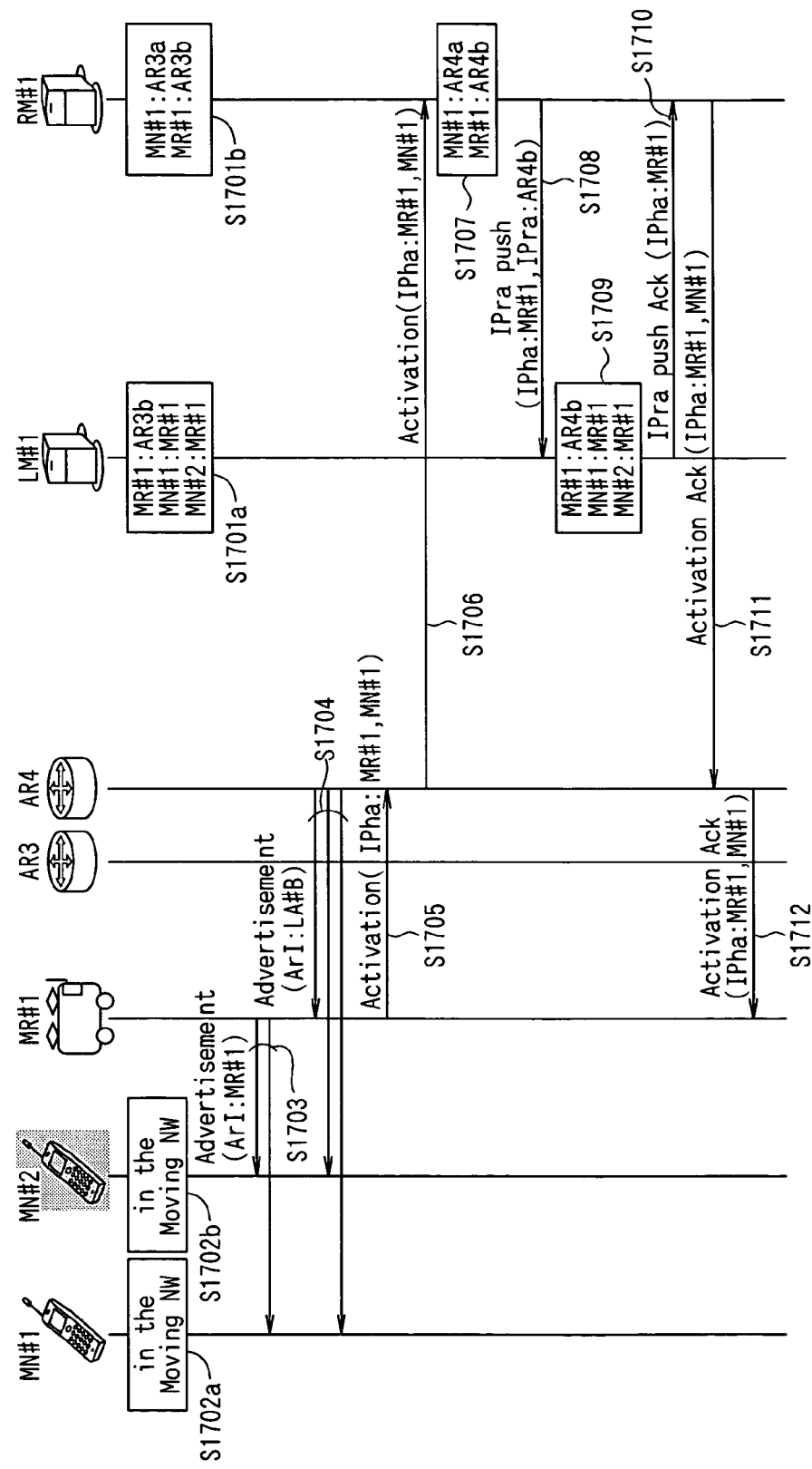
FIG. 8 is a sequence diagram showing a second operation example of the mobile communication system according to the first embodiment of the present invention.

Description will be made on a second operation example with reference to FIG. 8. In this operation example, a flag is not used unlike the first operation example described above. The figure shows the operations performed by the mobile nodes MN#1 and MN#2, the mobile router MR#1, the access routers AR3 and AR4, the LM#1 and the RM#1. The figure is associated with the block diagram shown in FIG. 1.

The figure is a sequence diagram showing the situation when location update is performed utilizing a procedure for updating RA information for the MR#1 and the MN#1 which are active. It is assumed here that the MR#1 and the MN#1 moved from management by the AR3 to management by the AR4 while they being active.

In the figure, it is registered with the RM#1 that the routing address for the identification (ID) "MN#1" is "AR3a" and that the routing address for the identification (ID) "MR#1" is "AR3b" (S1701b).

It is registered with the LM#1 that the LA for the identification (ID) "MR#1" is "AR3b" and that the LAs for the identifications (IDs) "MN#1" AND "MN#2" are both "MR#1" (S1701a).

The mobile node MN#1 exists in the moving network (S1702a), and the mobile node MN#2 also exists in the moving network (S1702b). The mobile router MR#1 has sent an advertisement indicating that the ArI is "MR#1" to all the mobile nodes (MN#1 and MN#2) within the moving network (S1703). The mobile nodes MN#1 and MN#2 and the mobile router MR#1 have received an advertisement indicating that the ArI is "LA#B", from the access router AR4 (S1704).

In this operation example, RA information for the MR#1 and the MN#1 in the RM#1 is updated in response to an activation signal (S1705 and S1706) signaled by the MR#1 as a representative. As a result of the update, it is registered with the RM#1 that the routing address for the identification (ID) "MN#1" is "AR4a" and that the routing address for the identification (ID) "MR#1" is "AR4b" (S1707).

After the update, the RM#1 sends a notification (IPra push) about RA information for the MR#1 to the LM#1 (S1708). Receiving the notification, the LM#1 stores the RA information as the LA information for MR#1. As a result, it is registered with the LM#1 that the LA for the identification (ID) "MR#1" is "AR4b" (S1709).

After the registration, the LM#1 sends a response (IPra push Ack) (S1710). When the RM#1 receives the response, a response to the activation signal is inputted into the mobile router MR#1 via the access router AR4 (S1711 and S1712).

When paging is performed to a dormant mobile node which is dependent on the mobile router, paging is performed to this routing address.

Description will be made on configurations of an LM and an RM for realizing the operation described above, with reference to FIGS. 9 and 10.

Figure 9:
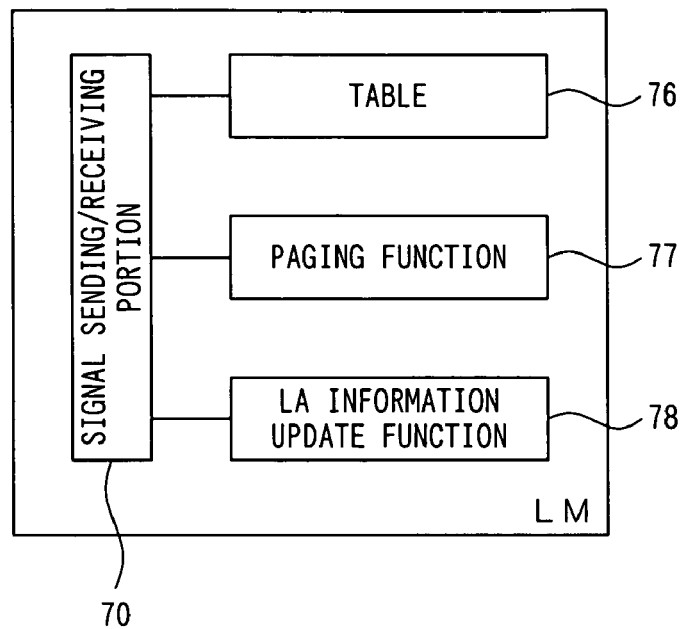
FIG. 9 is a block diagram showing a configuration example of an LM for realizing the second operation example of the mobile communication system according to the first embodiment of the present invention.

As shown in FIG. 9, the LM is configured to include a table 76 for storing LA information for mobile nodes and a mobile router; a paging function 77 for performing paging for using RA information stored in the table 76; an LA information update function 78 for updating LA information registered with the LM itself; and a signal sending/receiving portion 70 forming an interface for sending/receiving a signal between external apparatuses, such as an AR and an RM, and each portion within the LM itself. Updated RA information notified by the RM is stored in a table 76 as LA information.

Figure 10:
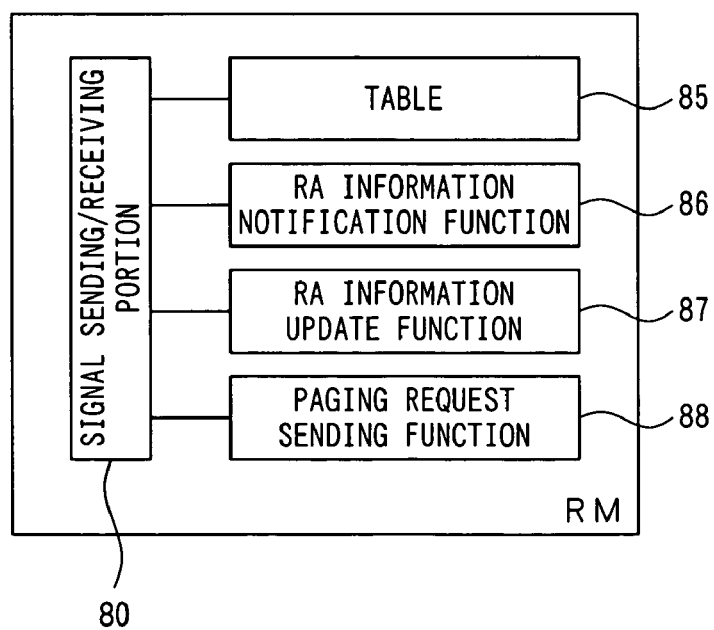
FIG. 10 is a block diagram showing a configuration example of an RM for realizing the second operation example of the mobile communication system according to the first embodiment of the present invention.

As shown in FIG. 10, an RM is configured to include a table 85 for storing RA information for mobile nodes and a mobile router; an RA information notification function 86 for, when RA information for a mobile router stored in the table 85 is updated, notifying the updated RA information to an LM; an RA information update function 87 for updating RA information registered with the RM itself; a paging request sending function 88 for sending a paging request; and a signal sending/receiving portion 80 forming an interface for sending/receiving a signal between external apparatuses such as an AR and an LM, and each portion within the RM itself.

Figure 11:
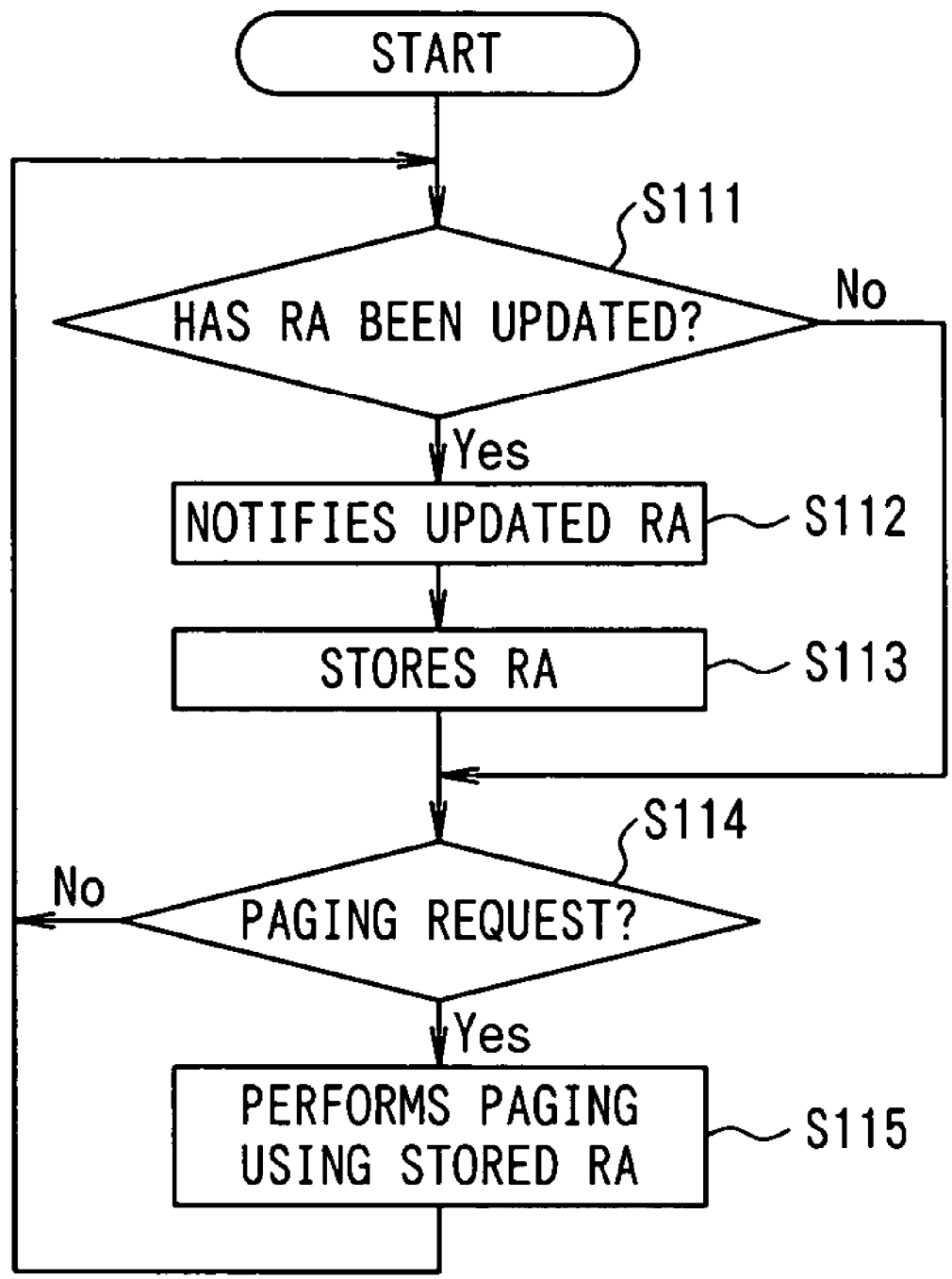
FIG. 11 is a flowchart showing the second operation example of the mobile communication system according to the first embodiment of the present invention.

Furthermore, description will be made on this operation example, with reference to a flowchart in FIG. 11. In the figure, it is determined first in the RM whether the RA information for the active mobile router has been updated (step S111).

If the RA information has been updated, the updated RA information is notified to the LM from the RM (from step S111 to S112). The notified RA information is then stored in the table in the LM (step S113).

It is then determined in the LM whether there has been received paging request to a mobile node (step S114). If there has been received paging request, the LM performs paging to the mobile node using the RA information for the mobile router which is stored in the table in the LM itself (step S114 to S115). If no paging request has been received, the process returns to step S111 to determine in the RM whether the RA information has been updated (step S114 to S111). The above process is repeatedly executed.

Unlike the first operation example, the operation described above makes it possible to perform paging to a mobile node which is in a master-slave relationship with the mobile router without retaining a flag in the table in the LM. Furthermore, by performing paging with the use of RA information, which is more detailed location information than LA information, it is possible to minimize consumption of wireless resources required for performing paging.

Second Embodiment

A. Configuration of a Mobile Communication System

Figure 12:
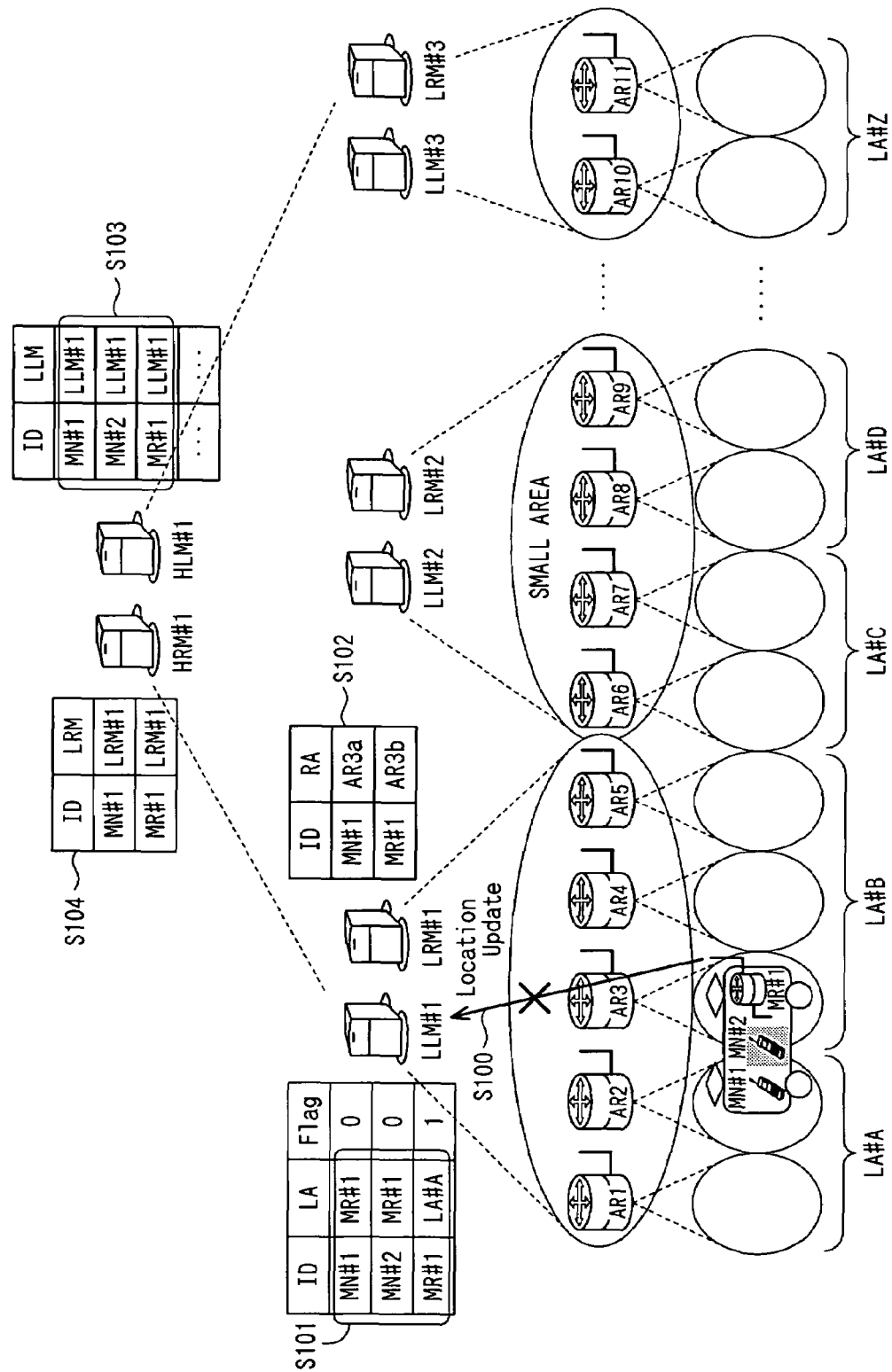
FIG. 12 shows a second embodiment of a mobile communication according to the present invention.

FIG. 12 shows a second embodiment of a mobile communication system according to the present invention. Unlike the first embodiment, a location manager with a two-hierarchical structure is adopted in this embodiment, which is constituted by a local location manager (hereinafter referred to as LLM for short) and a home location manager (hereinafter referred to as HLM for short). Similarly, as for a routing manager, one with a two-hierarchical structure is also adopted, which is constituted by a local routing manager (hereinafter referred to LRM for short) and a home routing manager (hereinafter referred to as HRM for short).

As shown in the figure, this system is configured to include local location managers LLM#1, LLM#2 and LLM#3 for storing LA information for mobile nodes and a mobile router, or master-slave relationship information indicating a master-slave relationship between the mobile router and the mobile nodes; a home location manager HLM#1 for storing LLM information, which is information on an LLM for the area where the mobile node and the mobile router MR#1 exist; local routing managers LRM#1, LRM#2 and LRM#3 for storing RA information for MNs and MRs; a home routing manager HRM#1 for storing information on an LRM for the area where the MNs and the MRs exist; and ARs 1 to 11 for notifying an ArI to a mobile node or a mobile router and retaining a correspondence relationship between the ArI and location area information managed within the network as an LA. That is, there is a hierarchical structure for each of the location manager and the routing manger in this embodiment.

As shown in the figure, this system is configured to include the mobile router MR#1 performing LU on behalf of MNs existing in the space in a moving body while the mobile router MR#1 and the MNs are moving in a dormant state; and mobile nodes MN#1 and MN#2, which do not perform LU when they are in the same space with the mobile router MR#1, even if they are dormant.

There are formed small areas for the location manager LLM#1 and the routing manager LRM#1, for the LLM#2 and the LRM#2, and for the LLM#3 and the LRM#3, respectively. One or more ARs are included in each area. Each of location areas LA#A, LA#B, LA#C, LA#D, . . . , LA#Z is a set of multiple areas, each of which is associated with each of the ARs.

Though not specifically shown in the figure, there are generally provided a router or a switch for transferring a signal between AR and LLM/LRM, between LLM/LRM and HLM/HRM, and between LLM/LRM and LLM/LRM.

It is registered with the LLM#1 that the LAs for the identifications (IDs) "MN#1" and "MN#2" are "MR#1" and that the LA for the identification (ID) "MR#1" is "LA#A" (S101).

In the LRM#1, there is stored RA information for the MR#1 and the MN#1 which are active. That is, it is registered that the RA information for the identification (ID) "MN#1" is "AR3a" and that RA information for the identification (ID) "MR#1" is "AR3b" (S102).

It is registered with the HLM#1 that LLM information for the identifications (IDs) "MN#1", MN#2" and "MR#1" is "LLM#1" (S103).

In the HRM#1, there is stored LRM information for the MR#1 and the MN#1 which are active. That is, it is registered that the LRM information for the identification (ID) "MN#1" is "LRM#1" and that LRM information for the identification (ID) "MR#1" is "LRM#1" (S104).

In this situation, if the MN#1 and the MR#1 move from the LA#A to the LA#B while being active, an LU signal is not sent from the MR#1 (S100). Accordingly, the LA for the MR#1 in the LLM#1 is still LA#A. In this case, when paging is performed to the dormant MN#2 which is in a master-slave relationship with the MR#1, the paging is performed to the LA#A where the MN#2 does not actually exist if the operation similar to that of a prior-art mobile communication system is performed. This causes a problem that the MN#2 existing in the LA#B cannot receive the paging.

To cope with this problem, it is conceivable that an MR should send an LU signal whether it is dormant or active. However, when an MR is active, in general, an LRM retaining routing addresses for the MR and MNs retains more detailed location information (RA information) than an LA, which is indicated by an AR for the area where the MR exists, and therefore it is inefficient from a viewpoint of consumption of finite wireless resources, that information in an LLM is updated by the MR sending an LU signal.

Accordingly, in this system, a flag for determining whether an MR is dormant or active is retained in a table in an LLM. When paging is performed to an MN in a master-slave relationship with the MR, the LLM determines the state of the MR. If the MR is determined to be active, the LLM inquires of the LRM about RA information for the MR, and performs paging to the address indicated by the obtained RA information.

Description will be made below on the procedure for performing paging, with reference to FIG. 13.

In the figure, when receiving an activation signal from the MN#1, which is going to perform origination (S201), the MR sends an activation notification signal to the LLM#1 and the LRM#1 (S202a and S202b). The LLM#1 sets "1" as a value of a flag for an entry for the identification (ID) "MR#1" in its table (S203a). In the LRM#1, for each of the entries with identifications (IDs) "MN#1" and "MR#1", RA information is written (S203b).

When the MR#1 moves from the LA#A to the LA#B (S204), a handover process is performed for the MN#1 and the MR#1, which are active. Consequently, an activation signal is sent from the MR#1 (S205), and the RA information is updated in the LRM#1 (S206).

In this case, if termination is performed to the MN#2 (S207), then the HRM#1, receiving the termination, sends a paging request (paging req) to the HLM#1 (S208) because it does not retain LRM information for the dormant MN#2. The HLM#1 sends the paging request to the LLM#1 (S209).

The LLM#1 detects that the MN#2 is dependent on the MR#1 and that the MR#1 is active. The LLM#1 therefore inquires of the LRM#1 about a routing address for the MR#1 (S210). In response to this, the routing address for the MR#1 "AR3b" is sent from the LRM#1 and inputted into the LLM#1 (S211). The LLM#1 performs paging to the MN#2 using the routing address "AR3b" (S212). Receiving this, the MR#1 sends a paging signal to the MN#2 (S213). The MN#2 is then active and in communication with the origination source.

B: Operation of the Mobile Communication System

First Operation Example

Figure 13:
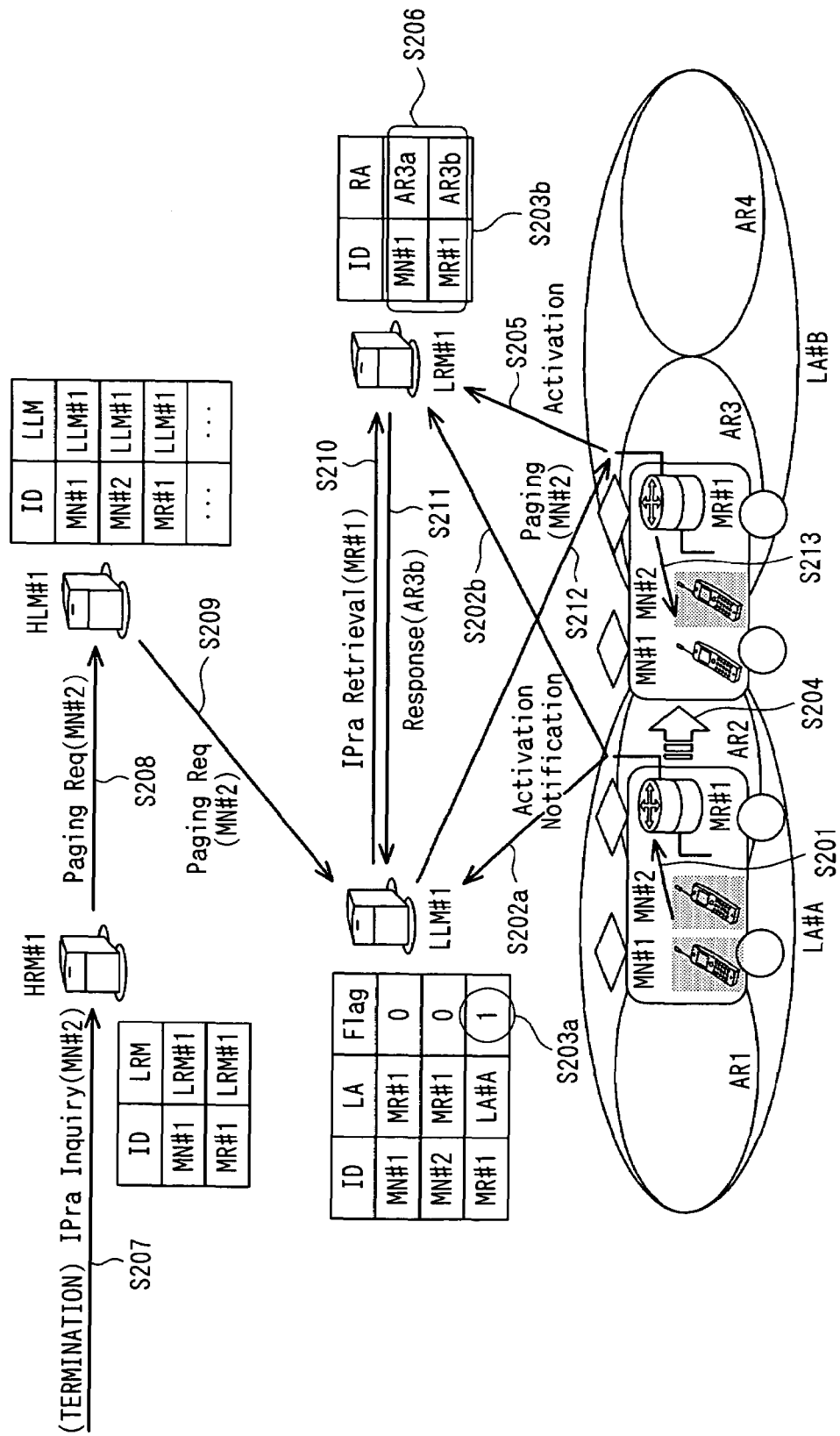
FIG. 13 shows a procedure for performing paging in the mobile communication system in FIG. 12.
Figure 14:
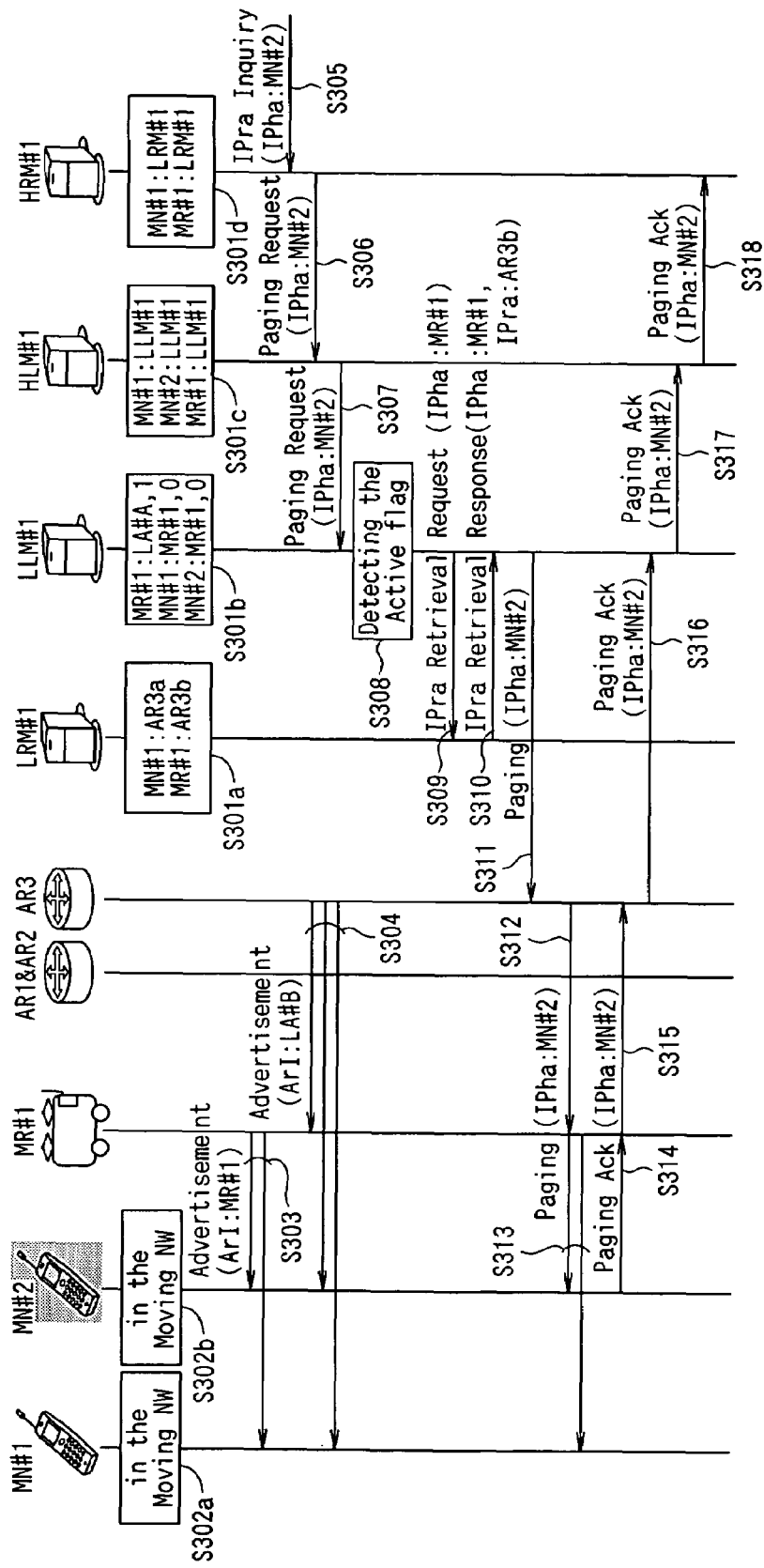
FIG. 14 is a sequence diagram showing the situation when paging is performed to a mobile node, which is in a master-slave relationship with a mobile router and is now dormant, in a first operation example of the mobile communication system according to the second embodiment of the present invention.

Description will be now made on a first operation example with reference to FIGS. 14 and 15 describing details of the procedure shown in FIG. 13. These figures show the operations performed by the mobile nodes MN#1 and MN#2, the mobile router MR#1, access routers AR1, AR2 and AR3, the LRM#1, the LLM#1, the HLM#1 and the HRM#1. These figures are associated with the configuration shown in FIG. 12.

FIG. 14 is a sequence diagram showing the situation when paging is performed to the MN#2 which is in a master-slave relationship with the MR#1 and is now dormant.

It is assumed here that the MR#1 and the MN#1 became active when they were in the LA#A and have moved from management by the AR2 included in the LA#A to management by the AR3 included in the LA#B while being active.

In the figure, RA information for the active MR#1 and MN#1 is stored in the LRM#1. That is, it is registered that the RA information for the identification (ID) "MN#1" is "AR3a" and that the RA information for the identification (ID) "MR#1" is "AR3b" (S301a).

It is registered with the LLM#1 that the LA for the identification "MR#1" is "LA#A" and the flag is "1", that the LA for the identification "MN#1" is "MR#1" and the flag is "0", and that the LA for the identification "MN#2" is "MR#1" and the flag is "0" (S301b).

It is registered with the HLM#1 that the LLM information for all of the identifications (IDs) "MN#1", "MN#2" and "MR#1" is "LLM#1" (S301c).

It is registered with the HRM#1 that the LRM information for both of the identifications (IDs) "MN#1" and "MR#1" is "LRM#1" (S301d).

The mobile node MN#1 exists in the moving network (S302a), and the mobile node MN#2 also exists in the moving network (S302b). The mobile router MR#1 has sent an advertisement indicating that the ArI is "MR#1" to all the mobile nodes (MN#1 and MN#2) within the moving network (S303). The mobile nodes MN#1 and MN#2 and the mobile router MR#1 have received an advertisement indicating that the ArI is "LA#B", from the access router AR3 (S304).

In this situation, if termination is performed to the mobile node MN#2 which is in a master-slave relationship with the MR#1 and is now dormant (S305), then the HRM#1, receiving the termination, searches for its table. If it detects that there is no entry about the MN#2, it recognizes that the MN#2 is dormant. The HRM#1 then identifies the HLM#1 as the HLM for the MN#2 using the identification IPha, which is a specific address, as a key, and sends a paging request (S306). Receiving this paging request, the HLM#1 searches for its table, detects that the MN#2 is under management by the LLM#1 and transfers the paging request to the LLM#1 (S307).

Receiving this paging request, the LLM#1 searches for its table and detects that the MN#2 is dependent on the MR#1 and the MR#1 exists in the LA#A. The LLM#1 then refers to the flag for the MR#1. Since the value of the flag for the MR#1 is "1", the LLM#1 detects that the MR#1 is active (S308).

Figure 15A:
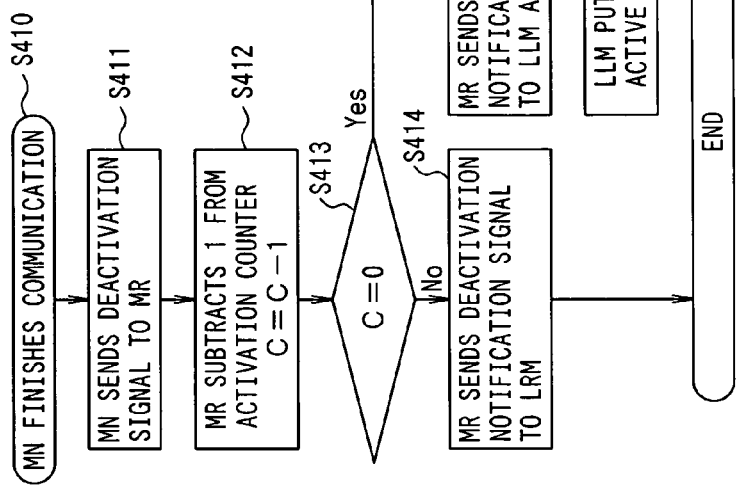
FIGS. 15A and 15B show flowcharts showing an example of an algorithm for controlling a flag in the mobile communication system according to the second embodiment of the present invention.
Figure 15B:
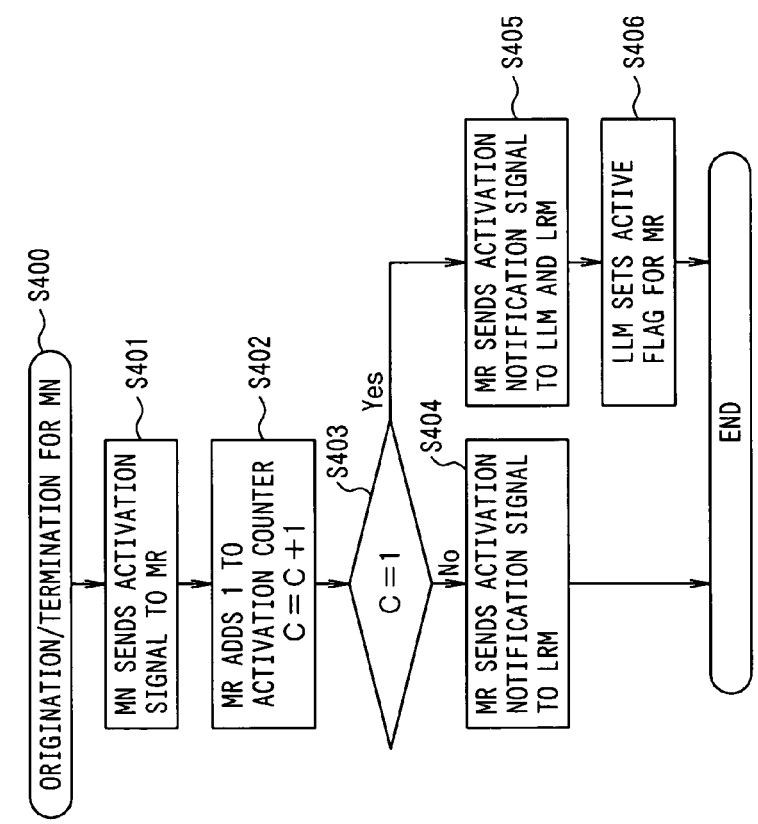

FIGS. 15A and 15B show an example of an algorithm for controlling the flag. In FIG. 15A, when origination/termination for MN is occurred (step S400), the MN sends an activation signal to an MR (step S401). In response to this, the MR adds 1 to a counter (activation counter) (step S402). That is, "C=C+1" is executed, where C is the count value of the counter.

If the count value C of the counter is not 1 (C≠1), the MR sends an activation notification signal only to the LRM (from step S403 to S404). On the contrary, if the count value C is 1 (C=1), the MR sends an activation notification signal to the LLM and the LRM (from step S403 to S405). The LLM then sets a flag (active flag) for the MR (step S406), and thereby the value of the flag becomes "1".

In FIG. 15B, when the MN finishes communication (step S410), the MN sends a deactivation signal to the MR (step S411). In response to this, the MR subtracts 1 from the counter (activation counter) (step S412). That is, "C=C−1" is executed, where C is the count value of the counter.

If the count value C of the counter is not 0 (C≠0), the MR sends a deactivation notification signal only to the LRM (from step S413 to S414). On the contrary, if the count value C is 0 (C=0), the MR sends a deactivation notification signal to the LLM and the LRM (from step S413 to S415). The LLM then puts down the flag (active flag) for the MR (step S416), and thereby the value of the flag becomes "0".

As described above, in this example, the MR grasps the number of active MNs based on the activation/deactivation signal which is sent when origination/termination for MN is occurred or when communication is finished. When the value changes from "0" to "1" and vice versa, it is notified to the LLM. Receiving the notification, the LLM controls setting and putting down of the flag, that is, setting for the flag for the MR.

In short, the flag for an MR is set to a value indicating an active state in response to a signal which is sent from a mobile node and indicates start of communication, and set to a value indicating a dormant state in response to a signal which is sent from a mobile node and indicates end of communication.

Returning to FIG. 14, the LLM#1, which has detected that the MR#1 is active from the value of the flag "1", inquires of the LRM#1 about RA information for the MR#1 (S309). Receiving this inquiry, the LRM#1 searches for its table and responds with "AR3b", which is RA information for the MR#1 (S310). Receiving the response, the LLM#1 performs paging to the "AR3b", which is the obtained RA information (S311). This paging signal is transferred to the MR#1 via the AR3 (S312) and signaled by the MR#1, which has received it, to the nodes within the moving body (S313). In this manner, the paging signal reaches the MN#2.

When the mobile node MN#2 sends a response (Paging Ack) in response to the paging signal (S314), the response is inputted into the HRM#1 via the mobile router MR#1, the access router AR3, the LLM#1 and the HLM#1 (S315, S316 S317 and S318).

The configurations of the LLM and the LRM for realizing the above operation are similar to those of the LM and the RM shown in FIGS. 5 and 6, and description therefore is omitted here. The operations of the LLM and the LRM are similar to those in FIG. 7 described above, and description therefore is also omitted here.

As described above, in this operation example, it is possible to perform paging to a mobile node which is in a master-slave relationship with a mobile router moving in an active state, without the mobile router consuming finite wireless resources in order to send an LU signal. Furthermore, by performing paging with the use of RA information, which is more detailed location information than LA information, it is possible to minimize consumption of wireless resources required for performing paging.

Second Operation Example

Figure 16:
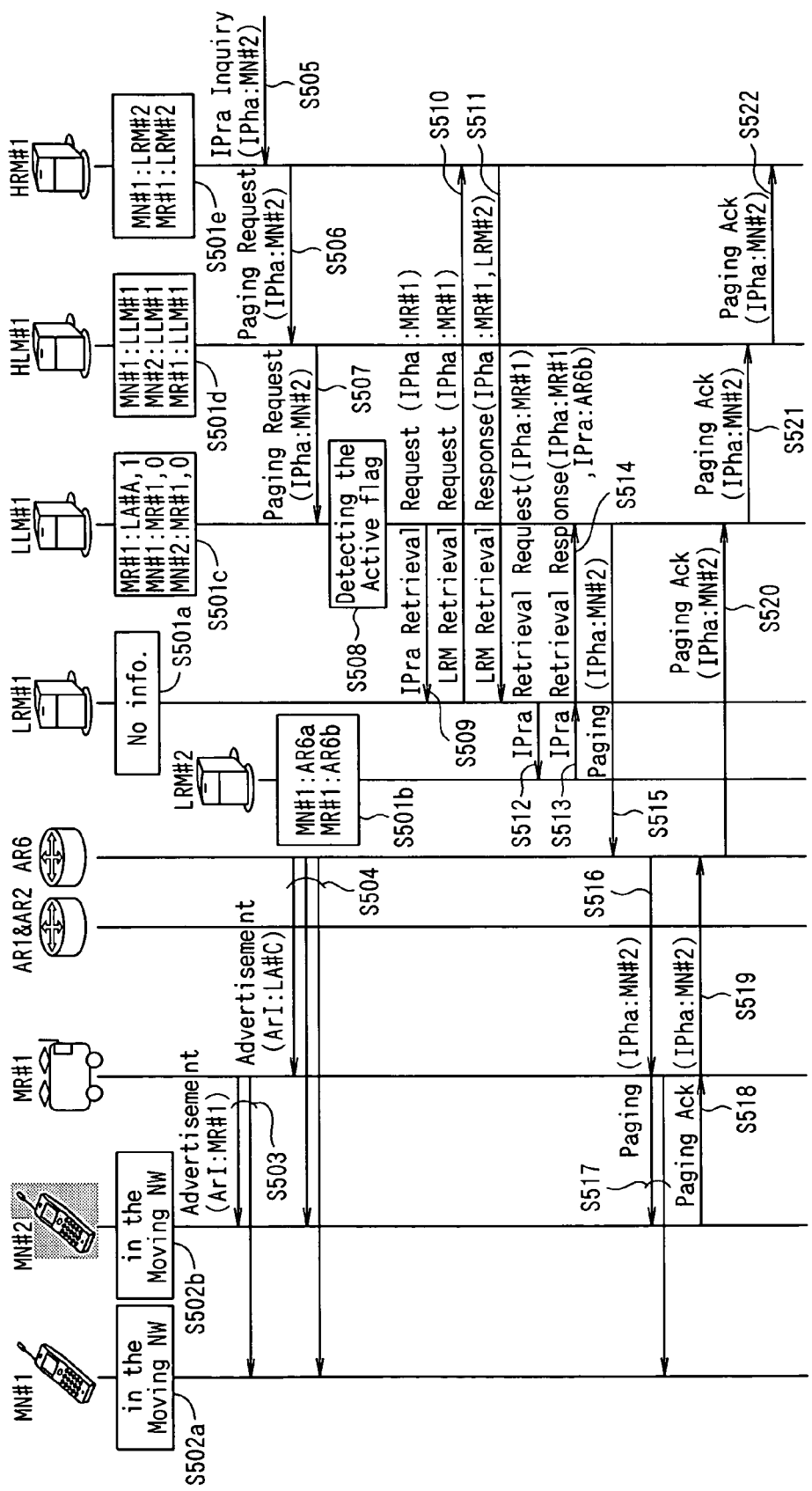
FIG. 16 is a sequence diagram showing the situation when paging is performed to a mobile node, which is in a master-slave relationship with a mobile router and is now dormant, in a second operation example of the mobile communication system according to the second embodiment of the present invention.

Description will be made on a second operation example with reference to FIG. 16. The figure shows the operations performed by the mobile nodes MN#1 and MN#2, the mobile router MR#1, access routers AR1, AR2 and AR6, the LRM#1, the LRM#2, the LLM#1, the HLM#1 and the HRM#1. This figure is associated with the block diagram shown in FIG. 12.

The figure is a sequence diagram showing the situation when paging is performed to the MN#2 which is in a master-slave relationship with the MR#1 and is now dormant. It is assumed that the MR#1 and the MN#1 became active when they were in the LA#A and have moved from management by the AR2 included in the LA#A to management by the AR6 included in the LA#C while being active, and that RA information for the active MR#1 and MN#1 is stored in the LRM#2.

In the figure, there is no information registered with the LRM#1 (S501a).

It is registered with the LRM#2 that the routing address for the identification (ID) "MN#1" is "AR6a" and that the routing address for the identification (ID) "MR#1" is "AR6b" (S501b).

It is registered with the LLM#1 that the LAs for the identification "MN#1" and "MN#2" are both "MR#1" and their flags are both "0", and that the LA for the identification "MR#1" is "LA#A" and the flag is "1" (S501c).

It is registered with the HLM#1 that the LLM information for all of the identifications (IDs) "MN#1", "MN#2" and "MR#1" is "LLM#1" (S501d).

It is registered with the HRM#1 that the LRM information for the identifications (IDs) "MN#1" and "MR#1" is "LRM#2" (S501e).

The mobile node MN#1 exists in the moving network (S502a), and the mobile node MN#2 also exists in the moving network (S502b). The "MR#1" to all the mobile nodes (MN#1 and MN#2) within the moving network (S503). The mobile nodes MN#1 and MN#2 and the mobile router MR#1 have received an advertisement indicating that the ArI is "LA#C", from the access router AR6 (S504).

In this situation, if termination is performed to the mobile node MN#2 (S505), then the HRM#1, receiving the termination, searches for its table. If it detects that there is no entry about the MN#2, it recognizes that the MN#2 is dormant. The HRM#1 then identifies the HLM#1 as the HLM for the MN#2 using the identification IPha, which is a specific address, as a key, and sends a paging request (S506). Receiving this paging request, the HLM#1 searches for its table, detects that the MN#2 is under management by the LLM#1 and transfers the paging request to the LLM#1 (S507).

Receiving this paging request, the LLM#1 searches for its table and detects that the MN#2 is dependent on the MR#1 and that the MR#1 exists in the LA#A. The LLM#1 then refers to the flag for the MR#1. Since the value of the flag for the MR#1 is "1" then, the LLM#1 detects that the MR#1 is active (S508).

Detecting that the MR#1 is active from the value of the flag "1", the LLM#1 inquires of the LRM#1 about RA information for the MR#1 (S509). Receiving this inquiry, the LRM#1 searches for its table. The LRM#1, detecting that there is no entry about the MR#1 in its table as a search result, identifies the HRM#1 as an HRM for the MR#1, using the IPha as a key, and sends a request for inquiring about the LRM information for the MR#1 which is managed by the identified HRM#1 (S510).

Receiving this request, the HRM#1 searches for its table and responds that the MR#1 is under management by the LRM#2 (S511). Receiving this response, the LRM#1 sends a request for inquiring of the LRM#2 about RA information for the MR#1 (S512).

Receiving this request, the LRM#2 searches for its table and responds to the LRM#1 with AR6b, which is the RA information for the MR#1 (S513). Receiving this response, the LRM#1 transfers it to the LLM#1 (S514).

The LLM#1 then performs paging to the "AR6b", which is the obtained RA information (S515). This paging signal is transferred to the MR#1 via the AR6 (S516), and the MR#1, receiving it, signals it to the nodes within the moving body (S517). In this manner, the paging signal reaches the MN#2.

When the mobile node MN#2 sends a response (Paging Ack) in response to the paging signal (S518), the response is inputted into the HRM#1 via the mobile router MR#1, the access router AR6, the LLM#1 and the HLM#1 (S519, S520, S521 and S522).

Third Operation Example

Figure 17:
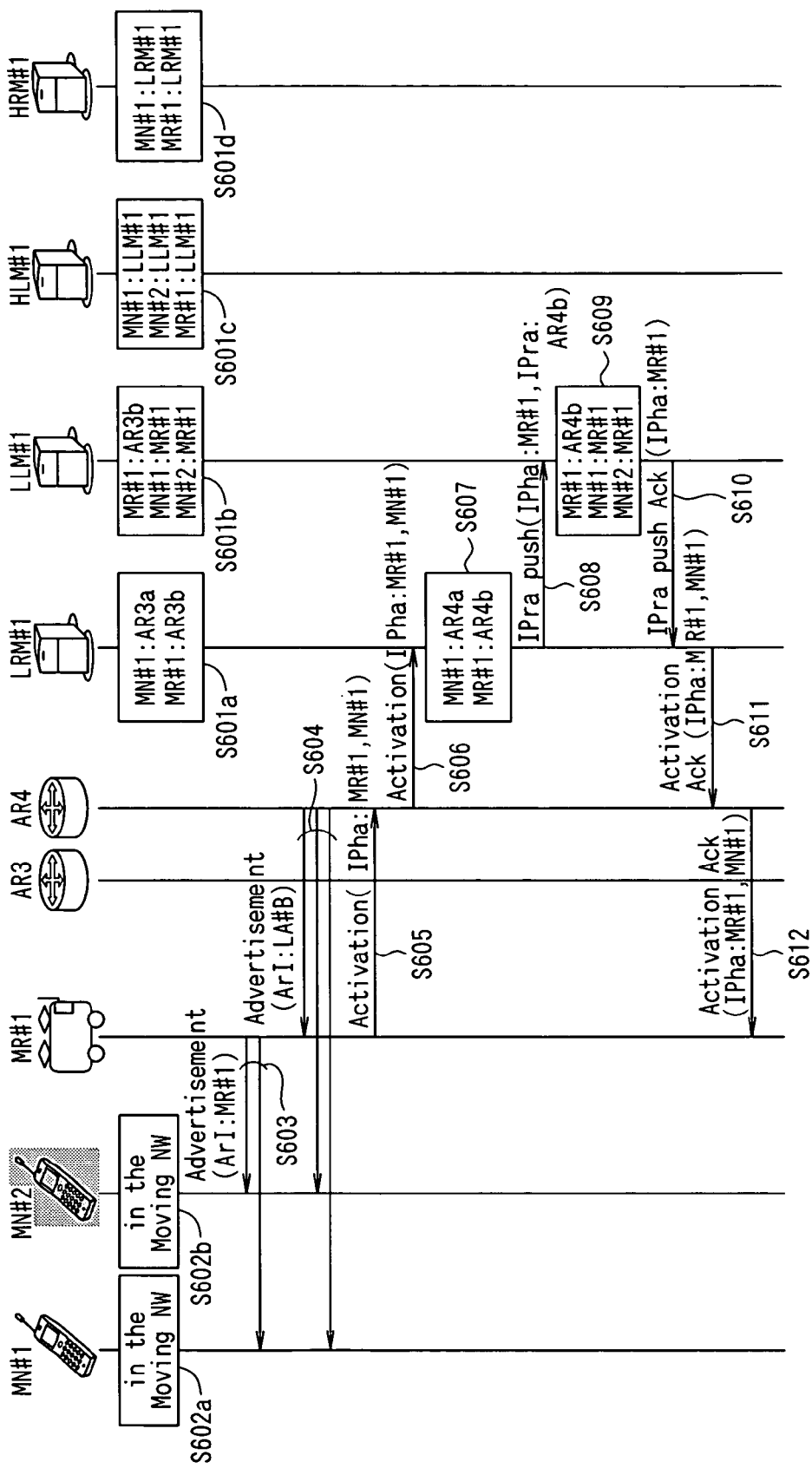
FIG. 17 is a sequence diagram showing a third operation example of the mobile communication system according to the second embodiment of the present invention.

Description will be made on a third operation example with reference to FIG. 17. In this operation example, a flag is not used unlike the first and the second operation examples described above. The figure shows the operations performed by the mobile nodes MN#1 and MN#2, the mobile router MR#1, access routers AR3 and AR4, the LRM#1, the LLM#1, the HLM#1 and the HRM#1. The figure is associated with the block diagram shown in FIG. 12.

The figure is a sequence diagram showing the situation when location update is performed utilizing a procedure for updating RA information for the MR#1 and the MN#1 which are active. It is assumed here that the MR#1 and the MN#1 have moved from management by the AR3 to management by the AR4 while being active.

In the figure, it is registered with the LRM#1 that the routing address for the identification (ID) "MN#1" is "AR3a" and that the routing address for the identification (ID) "MR#1" is "AR3b" (S601a).

It is registered with the LLM#1 that the LA for the identification (ID) "MR#1" is "AR3b" and that the LAs for the identifications (IDs) "MN#1" and "MN#2" are both "MR#1" (S601b).

It is registered with the HLM#1 that the LLM information for all the identifications (IDs) "MN#1", "MN#2" and "MR#1" is "LLM#1" (S601c).

It is registered with the HRM#1 that the LRM information for the identifications (IDs) "MN#1" and "MR#1" are "LRM#1" (S601d).

The mobile node MN#1 exists in the moving network (S602a), and the mobile node MN#2 also exists in the moving network (S602b). The mobile router MR#1 has sent an advertisement indicating that the ArI is "MR#1" to all the mobile nodes (MN#1 and MN#2) within the moving network (S603). The mobile nodes MN#1 and MN#2 and the mobile router MR#1 have received an advertisement indicating that the ArI is "LA#B", from the access router AR4 (S604).

In this operation example, in response to an activation signal which the MR#1 has sent as a representative (S605 and S606), the RA information for the MR#1 and the MN#1 is updated in the LRM#1. As a result of the update, it is registered with the LRM#1 that the routing address for the identification (ID) "MN#1" is "AR4a" and that the routing address for the identification (ID) "MR#1" is "AR4b" (S607).

After the update, the LRM#1 sends notification about the RA information for the MR#1 (IPra push) to the LLM#1 (S608). Receiving the notification, the LLM#1 stores the RA information as LA information for the MR#1. As a result, it is registered with the LLM#1 that the LA for the identification (ID) "MR#1" is "AR4b" (S609).

After the registration, when the LLM#1 sends a response (IPra push Ack) (S610) and the LRM#1 receives the response, an response to the activation signal is inputted into the mobile router MR#1 via the access router AR4 (S611 and S612).

When paging is performed to a dormant mobile node, which is dependent on the mobile router, the paging is performed to the routing address.

The configurations of the LLM and the LRM for realizing the above operation are similar to those of the LM and the RM shown in FIGS. 9 and 10, and description therefore is omitted here. The operations of the LLM and the LRM are similar to those in FIG. 11 described above, and description therefore is also omitted here.

The operation described above makes it possible to perform paging to a mobile node which is in a master-slave relationship with the mobile router without retaining a flag in the table in the LLM, unlike the first and second operation examples. Furthermore, by performing paging with the use of RA information, which is more detailed location information than LA information, it is possible to minimize consumption of wireless resources required for performing paging.

Variation Embodiments

The present invention is not limited to the embodiments described above and includes the following variations, for example.

(1) The flag indicating whether or not the MR is active is not used in the LM or the LLM. When a paging request is received for a dormant MN which in a master-slave relationship with the MR, the LM or the LLM performs paging to the MN based on the information on LA where the MR exists, which information the LM or the LLM itself has. In this case, if no response is returned from the MN within a predetermined time, the LM or the LLM inquires of the RM or the LRM about RA information for the MR, and performs paging to the address indicated by the obtained RA information. That is, paging is performed with the use of the LA information stored in the LM or the LLM, and only when there is no response within a predetermined time, RA information is inquired and paging is performed to the address indicated by the obtained RA information.

(2) The flag indicating whether or not the MR is active is not used in the LM or the LLM. When a paging request is received for a dormant MN which is in a master-slave relationship with the MR, the LM or the LLM inquires of the RM or the LRM about RA information for the MR. If the RA information is replied from the RM or the LRM, paging is performed to the address indicated by the RA information. On the other hand, if the RA information is not replied from the RM or the LRM, paging is performed to the MN based on the LA information for the MR which the LM or the LLM itself has.

(3) It is possible to convert the RA information obtained from the RM or the LRM into LA information and store the information in the LM or the LLM in order to perform paging to the address indicated by the LA information.

(4) The MR installed in a moving body grasps MNs which are dependent on the MR itself, and sends not only its IPha but also IPhas of the dependent MNs when performing LU for itself. Thereby, when the master-slave relationship between the MR and the MNs is not retained in the LM or the LLM, a flag indicating an active state or a dormant state is set or put down not only for the MR but also for the MNs.

(5) Setting and putting down of the flag for the MR and the MNs is performed by the RM or the LRM notifying the LM or the LLM to the effect in response to whether or not there is RA information.

(6) When the flag is not retained in the LM or the LLM, or when setting and putting down of the flag is performed in response to whether or not there is RA information in RM or LRM as in the variation (5), a signal may be transferred between the MNs in a moving body and the AR not via the MR but directly.

(7) Though description has been made on a two-stage master-slave relationship between the MR and the MNs as an example, the present invention may be applied to such cases where the relationship is repeated in multiple stages.

(8) Though description has been made on the case where neither of the location manager nor the routing manager has a hierarchical structure in the first embodiment and on the case where both of the managers have a hierarchical structure in the second embodiment, only one of the managers may have a hierarchical structure. That is, the present invention may be applied to either of a mobile communication system using the LLM, HLM and RM or a mobile communication system using the LM, LRM and HRM.

As described above, in the present invention, a flag for determining whether a mobile router is dormant or active is retained in a location manager; the location manager determines the state of the mobile router when paging is performed to a mobile node which is in a master-slave relationship with the mobile router; the location manager, when the mobile router is determined to be active, inquires of a routing manager about routing address information for the mobile router and performs paging to the address indicated by the obtained routing address information. Thus, the present invention is advantageous in making it possible to perform paging to a mobile node which is in a master-slave relationship with a mobile router moving in an active state, without the mobile router consuming finite wireless resources to send a location update signal.

Furthermore, the present invention is advantageous in making it possible to easily recognize whether the state is active or dormant by controlling the value of a flag with the utilization of a signal which indicates start/end of an active state.

Furthermore, the present invention is advantageous in making it possible to perform paging to a mobile node which is in a master-slave relationship with a mobile router, without retaining a flag by notifying, each time a routing address is updated, the updated routing address to a location manager and retaining it as location area information.

The present invention is also advantageous in making it possible to minimize consumption of wireless resources required for performing paging by performing paging with the use of a routing address which indicates more detailed location information than location area information.

What is claimed is:

1. A cellular communication system wherein a mobile communication service area is divided into a plurality of location registration areas, the cellular communication system comprising:

a mobile router and at least one mobile node, moving in a moving body and in a master-slave relationship, the mobile router performing location update of the mobile node that does not perform the location update, if the mobile node is an a dormant state;

a unit for retaining a flag indicating whether the mobile router is in an active state or a dormant state;

a unit for inquiring about routing address information of the mobile router in an active state based on a value of the retained flag when paging is performed to at least one of the mobile nodes; and a unit for performing paging to the at least one mobile node, using the obtained routing address information of the mobile router in an active state as a result of the inquiry.

2. The cellular communication system according to claim 1, further comprising a unit for setting the flag to a first value indicating an active state in response to a first signal sent from the mobile node and indicating start of communication, and setting the flag to a second value indicating a dormant state in response to a second signal sent from the mobile node and indicating end of communication.

3. A cellular communication system wherein a mobile communication service area is divided into a plurality of location registration areas, the cellular communication system comprising:

a mobile router and at least one mobile node, moving in a moving body and in a master-slave relationship, the mobile router performing location update of the mobile node that does not perform the location update, if the mobile node is in a dormant state;

a routing manager; and a location manager, the routing manager comprising:
a table for storing routing address information for the mobile router; and
a unit for, when the routing address information for the mobile router in the table is updated, notifying the updated routing address information to the location manager; and the location manager comprising:
a table for storing the routing address information notified by the routing manager as location area information of the mobile router in an active state; and
a unit for performing paging to at least one of the mobile nodes using the location area information of the mobile router in an active state stored in the table.

4. A location manager for use in a cellular communication system wherein a mobile communication service area is divided into a plurality of location registration areas, and a mobile router in a dormant state moving with a plurality of mobile nodes in a dormant state, the mobile router performing location update of the mobile nodes on behalf of the mobile nodes that do not perform the location update, the location manager comprising:
a unit for retaining a flag indicating whether the mobile router is in an active state or a dormant state;
a unit for inquiring about routing address information of the mobile router based on a value of the retained flag when paging is performed to at least one of the mobile nodes; and
a unit for performing paging to at least one of the mobile nodes in a master-slave relationship with the mobile router, using the routing address information of the mobile router in an active state obtained as a result of the inquiry.

5. The location manager according to claim 4 further comprising a unit for setting the flag to a first value indicating an active state in response to a first signal sent from the mobile node and indicating a start of communication, and setting the flag to a second value indicating a dormant state in response to a second signal sent from the mobile node and indicating an end of communication.

6. A location manager for use in a cellular communication system wherein a mobile communication service area is divided into a plurality of location registration areas, and a mobile router in a dormant state moving with a plurality of mobile nodes in a dormant state, the mobile router performing location update of the mobile nodes on behalf of the mobile nodes that do not perform the location update, the location manager comprising:
a table for storing routing address information for the mobile router, which is notified from a routing manager whenever the routing address information is updated, as location area information for the mobile router; and
a unit for performing paging to at least one of the mobile nodes in a master-slave relationship with the mobile router, using the location area information of the mobile router in an active state stored in the table.

7. A routing manager used for a cellular communication system wherein a mobile communication service area is divided into a plurality of location registration areas, and a mobile router in a dormant state moving with a plurality of mobile nodes in a dormant state, the mobile router performing location update of the mobile nodes in a master-slave relationship with the mobile router, on behalf of the mobile nodes that do not perform the location update, the routing manager comprising:
a table for storing routing address information of the mobile router in an active state; and
a unit for replying the routing address intonation stored in the table in response to an inquiry from a location manager about the routing address information for the mobile router in an active state.

8. A routing manager used for a cellular communication system wherein a mobile communication service area is divided into a plurality of location registration areas, and a mobile router in a dormant state moving with a plurality of mobile nodes in a dormant state, the mobile router performing location update of the mobile nodes in a master-slave relationship with the mobile router, on behalf of the mobile nodes that do not perform the location update, the routing manager comprising:
a table for storing routing address information for the mobile router in an active state; and
a unit for, when the routing address information for the mobile router in an active state in the table is updated, notifying the updated routing address information to a location manager.

* * * * *